United States Patent
Eichler et al.

(10) Patent No.: US 7,532,647 B2
(45) Date of Patent: May 12, 2009

(54) METHODS AND SYSTEMS FOR AUTO-CORRELATING MESSAGE TRANSFER PART (MTP) PRIORITY AND INTERNET PROTOCOL (IP) TYPE OF SERVICE IN CONVERGED NETWORKS

(75) Inventors: Todd Eichler, Wake Forest, NC (US); Robert John Delaney, Raleigh, NC (US)

(73) Assignee: Tekelec, Morrisville, NC (US)

( * ) Notice: Subject to any disclaimer, the term of this patent is extended or adjusted under 35 U.S.C. 154(b) by 524 days.

(21) Appl. No.: 10/890,779

(22) Filed: Jul. 14, 2004

(65) Prior Publication Data

US 2006/0013264 A1    Jan. 19, 2006

(51) Int. Cl.
*H04J 3/12* (2006.01)

(52) U.S. Cl. .................. 370/524; 370/528

(58) Field of Classification Search ............. 370/522, 370/395.21, 395.42, 467, 444–449, 455, 370/496, 524, 528
See application file for complete search history.

(56) References Cited

U.S. PATENT DOCUMENTS

| | | | |
|---|---|---|---|
| 5,008,929 A | 4/1991 | Olsen et al. | |
| 5,142,622 A | 8/1992 | Owens | |
| 5,173,897 A | 12/1992 | Schrodi et al. | |
| 5,208,811 A | 5/1993 | Kashio et al. | |
| 5,239,542 A | 8/1993 | Breidenstein et al. | |
| 5,315,641 A | 5/1994 | Montgomery et al. | |
| 5,384,840 A | 1/1995 | Blatchford et al. | |
| 5,420,916 A | 5/1995 | Sekiguchi | |
| 5,430,727 A | 7/1995 | Callon | |
| 5,477,531 A | 12/1995 | McKee et al. | |
| 5,497,460 A | 3/1996 | Bailey et al. ......... | 395/183.15 |
| 5,509,010 A | 4/1996 | LaPorta et al. | |
| 5,553,097 A | 9/1996 | Dagher ................ | 375/240 |
| 5,568,487 A | 10/1996 | Sitbon et al. | |
| 5,581,558 A | 12/1996 | Horney, II et al. | |
| 5,583,926 A | 12/1996 | Venier et al. | |
| 5,583,927 A | 12/1996 | Fly et al. | |
| 5,586,177 A | 12/1996 | Farris et al. | |

(Continued)

FOREIGN PATENT DOCUMENTS

CA    2239764    12/1998

(Continued)

OTHER PUBLICATIONS

"IBM Cabling System Technical Summary", http://www.techfest.com/networking/cabling/ibmcs.htm, 1999-2002; pp. 1-3.

(Continued)

*Primary Examiner*—Seema S Rao
*Assistant Examiner*—Xavier Szewai Wong
(74) *Attorney, Agent, or Firm*—Jenkins, Wilson, Taylor & Hunt, P.A.

(57) ABSTRACT

Methods and systems for automatically correlating signaling message priority and IP priority are disclosed. A priority level of a signaling message may be determined based on a priority parameter in the signaling message or a user based priority. The signaling message is encapsulated in an IP packet. A priority level in the IP packet is set based on the priority level determined for the signaling message.

28 Claims, 9 Drawing Sheets

U.S. PATENT DOCUMENTS

| | | |
|---|---|---|
| 5,592,530 A | 1/1997 | Brockman et al. |
| 5,610,910 A | 3/1997 | Focsaneanu et al. |
| 5,612,949 A | 3/1997 | Bennett |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,661,790 A | 8/1997 | Hsu |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,754,752 A | 5/1998 | Sheh et al. |
| 5,761,281 A | 6/1998 | Baum et al. |
| 5,761,290 A | 6/1998 | Farris et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,425 A | 8/1998 | Balakrishnan |
| 5,793,771 A | 8/1998 | Darland et al. |
| 5,802,285 A | 9/1998 | Hirviniemi |
| 5,805,587 A | 9/1998 | Norris et al. |
| 5,809,028 A | 9/1998 | Nethercott et al. |
| 5,812,669 A | 9/1998 | Jenkins et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A | 4/1999 | Longfield et al. |
| 5,905,724 A | 5/1999 | Carson et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,933,490 A | 8/1999 | White et al. |
| 5,940,598 A | 8/1999 | Strauss et al. |
| 5,949,871 A | 9/1999 | Kabay et al. |
| 5,958,016 A | 9/1999 | Chang et al. |
| 5,966,431 A | 10/1999 | Reiman et al. |
| 5,971,900 A | 10/1999 | Miller |
| 5,974,052 A | 10/1999 | Johnson et al. |
| 5,991,301 A | 11/1999 | Christie |
| 5,995,608 A | 11/1999 | Detampel, Jr. et al. |
| 6,002,754 A | 12/1999 | Jaiswal et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,021,126 A | 2/2000 | White et al. |
| 6,023,502 A | 2/2000 | Bouanaka et al. |
| 6,026,091 A | 2/2000 | Christie et al. |
| 6,028,921 A | 2/2000 | Malik et al. |
| 6,035,020 A | 3/2000 | Weinstein et al. |
| 6,047,005 A | 4/2000 | Sherman |
| 6,055,202 A | 4/2000 | Merritt |
| 6,055,302 A | 4/2000 | Schmersel et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,081,589 A | 6/2000 | Jiang et al. |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,036 A | 8/2000 | Teshima et al. |
| 6,097,719 A | 8/2000 | Benash et al. |
| 6,097,805 A | 8/2000 | Figurski et al. |
| 6,111,780 A | 8/2000 | Bertin |
| 6,111,870 A | 8/2000 | Kurtz |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,119,160 A | 9/2000 | Zhang et al. |
| 6,122,255 A | 9/2000 | Bartholomew et al. |
| 6,122,263 A | 9/2000 | Dahlin et al. |
| 6,122,363 A | 9/2000 | Friedlander et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,138,110 A | 10/2000 | Jahn et al. |
| 6,144,667 A | 11/2000 | Doshi et al. |
| 6,144,670 A | 11/2000 | Sponaugle et al. |
| 6,147,999 A | 11/2000 | Honda et al. |
| 6,151,390 A | 11/2000 | Volftsun et al. |
| 6,154,445 A | 11/2000 | Farris et al. |
| 6,154,467 A | 11/2000 | Hager et al. |
| 6,154,784 A | 11/2000 | Liu ............................ 709/250 |
| 6,157,710 A | 12/2000 | Figurski et al. |
| 6,167,025 A | 12/2000 | Hsing et al. |
| 6,178,181 B1 | 1/2001 | Glitho |
| 6,189,031 B1 | 2/2001 | Badger et al. |
| 6,192,051 B1 | 2/2001 | Lipman et al. |
| 6,195,425 B1 | 2/2001 | Farris |
| 6,201,804 B1 | 3/2001 | Kikinis |
| 6,208,642 B1 | 3/2001 | Balachandran et al. |
| 6,215,783 B1 | 4/2001 | Neyman |
| 6,236,722 B1 | 5/2001 | Gilbert et al. |
| 6,240,067 B1 | 5/2001 | Sorber |
| 6,278,697 B1 | 8/2001 | Brody et al. |
| 6,285,754 B1 | 9/2001 | Sun et al. |
| 6,292,479 B1 | 9/2001 | Bartholomew et al. |
| 6,307,926 B1 | 10/2001 | Barton et al. |
| 6,311,186 B1 | 10/2001 | MeLampy et al. |
| 6,324,173 B1 | 11/2001 | Deschaine et al. |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,327,350 B1 | 12/2001 | Spangler et al. |
| 6,330,250 B1 | 12/2001 | Curry et al. |
| 6,330,614 B1 | 12/2001 | Aggarwal et al. |
| 6,332,166 B1 | 12/2001 | Cranford, Jr. et al. ....... 709/250 |

| | | |
|---|---|---|
| 6,333,931 B1 | 12/2001 | LaPier et al. |
| 6,335,937 B1 | 1/2002 | Chao et al. |
| 6,349,099 B1 | 2/2002 | Larikka et al. |
| 6,366,655 B1 | 4/2002 | Book et al. |
| 6,377,799 B1 | 4/2002 | Hameleers et al. |
| 6,385,301 B1 | 5/2002 | Nolting et al. |
| 6,393,022 B1 | 5/2002 | Hewett et al. |
| 6,393,581 B1 | 5/2002 | Friedman et al. |
| 6,411,604 B1 | 6/2002 | Brockman et al. |
| 6,411,632 B2 | 6/2002 | Lindgren et al. |
| 6,415,027 B1 | 7/2002 | Malik |
| 6,425,009 B1 | 7/2002 | Parrish et al. |
| 6,430,189 B1 | 8/2002 | Juntumaa et al. |
| 6,442,169 B1 | 8/2002 | Lewis |
| RE37,826 E | 9/2002 | Samueli et al. .............. 370/402 |
| 6,448,500 B1 | 9/2002 | Hosaka et al. .......... 174/113 R |
| 6,459,697 B1 * | 10/2002 | Neyman ..................... 370/352 |
| 6,459,783 B1 | 10/2002 | March et al. |
| 6,483,837 B1 | 11/2002 | Howell et al. |
| 6,483,842 B1 | 11/2002 | Mauger |
| 6,487,286 B1 | 11/2002 | Reaves et al. |
| 6,496,512 B1 | 12/2002 | Medhat |
| 6,501,764 B1 * | 12/2002 | Fudatate et al. ............. 370/445 |
| 6,504,923 B1 | 1/2003 | Swale |
| 6,507,649 B1 | 1/2003 | Tovander |
| 6,515,985 B2 | 2/2003 | Shmulevich et al. |
| 6,522,667 B1 | 2/2003 | Oda et al. |
| 6,529,524 B1 | 3/2003 | Liao et al. |
| 6,533,427 B2 | 3/2003 | Chang et al. |
| 6,535,599 B1 | 3/2003 | Torrey et al. |
| 6,542,497 B1 | 4/2003 | Curry et al. |
| 6,546,003 B1 | 4/2003 | Farris |
| 6,563,835 B1 | 5/2003 | Chen |
| 6,574,216 B1 | 6/2003 | Farris et al. |
| 6,577,626 B2 | 6/2003 | Christie et al. |
| 6,584,190 B1 | 6/2003 | Bressler |
| 6,594,246 B1 | 7/2003 | Jorgensen |
| 6,594,258 B1 | 7/2003 | Larson et al. |
| 6,611,532 B1 | 8/2003 | Madour et al. |
| 6,611,533 B1 | 8/2003 | Liao et al. |
| 6,625,170 B1 | 9/2003 | Curry et al. |
| 6,631,133 B1 | 10/2003 | Christi et al. |
| 6,636,504 B1 | 10/2003 | Albers et al. |
| 6,668,051 B1 | 12/2003 | Ashdown et al. |
| 6,674,748 B1 | 1/2004 | Dykhuizen et al. |
| 6,678,242 B1 | 1/2004 | Simon |
| 6,680,953 B1 | 1/2004 | Kim |
| 6,681,009 B1 | 1/2004 | Graf et al. |
| 6,683,881 B1 | 1/2004 | Mijares et al. |
| 6,724,752 B1 | 4/2004 | Turtiainen et al. |
| 6,731,741 B1 | 5/2004 | Fourcand et al. |
| 6,760,343 B1 | 7/2004 | Krishnamurthy et al. |
| 6,782,004 B1 | 8/2004 | Brusilovsky et al. |
| 6,912,590 B1 | 6/2005 | Lundbäck et al. |
| 6,940,866 B1 | 9/2005 | Miller et al. |
| 6,944,184 B1 | 9/2005 | Miller et al. |
| 6,954,526 B1 | 10/2005 | Glenn et al. |
| 6,965,592 B2 | 11/2005 | Tinsley et al. |
| 6,967,956 B1 | 11/2005 | Tinsley et al. |
| 6,987,781 B1 | 1/2006 | Miller et al. |
| 6,990,089 B2 | 1/2006 | Benedyk et al. |
| 6,996,225 B1 * | 2/2006 | Bordonaro et al. .......... 379/229 |
| 7,002,988 B1 | 2/2006 | Benedyk et al. |
| 7,031,340 B2 | 4/2006 | Sprague et al. |
| 7,046,667 B2 | 5/2006 | Sprague et al. |
| 7,050,456 B1 | 5/2006 | Sprague et al. |
| 7,088,728 B2 * | 8/2006 | Delaney et al. ............. 370/410 |
| 7,113,581 B2 | 9/2006 | Benedyk et al. |
| 7,120,139 B1 * | 10/2006 | Kung et al. ................. 370/352 |
| 7,190,702 B2 | 3/2007 | Sprague et al. |
| 7,242,695 B2 | 7/2007 | Sprague et al. |
| 7,318,091 B2 | 1/2008 | Brendes et al. |
| 7,327,670 B2 | 2/2008 | Sprague et al. |
| 2001/0029182 A1 | 10/2001 | McCann et al. |
| 2001/0046227 A1 | 11/2001 | Matsuhira et al. |
| 2001/0046234 A1 | 11/2001 | Agrawal et al. |
| 2001/0049730 A1 | 12/2001 | Brendes et al. |
| 2001/0055380 A1 | 12/2001 | Benedyk et al. |
| 2002/0048360 A1 | 4/2002 | Zambre et al. |
| 2002/0105969 A1 | 8/2002 | Benedyk et al. |
| 2002/0131400 A1 * | 9/2002 | Tinsley et al. ............... 370/352 |
| 2002/0150221 A1 | 10/2002 | Carson et al. |
| 2003/0047342 A1 | 3/2003 | Rotta et al. ................. 174/68.1 |
| 2003/0156578 A1 | 8/2003 | Bergenlid et al. |
| 2003/0191883 A1 | 10/2003 | April .......................... 710/305 |
| 2004/0114611 A1 | 6/2004 | O'Connell et al. |
| 2005/0238036 A1 | 10/2005 | Miller et al. |
| 2005/0265341 A1 | 12/2005 | Benedyk et al. |
| 2005/0286502 A1 | 12/2005 | Benedyk et al. |
| 2006/0013203 A1 | 1/2006 | Benedyk et al. |
| 2006/0013204 A1 | 1/2006 | Benedyk et al. |
| 2006/0077978 A1 | 4/2006 | Sprague et al. |
| 2008/0075068 A1 | 3/2008 | Brendes et al. |
| 2008/0075115 A1 | 3/2008 | Brendes et al. |

FOREIGN PATENT DOCUMENTS

| | | |
|---|---|---|
| EP | 0 853 411 A2 | 7/1998 |
| EP | 1 014 735 | 12/1999 |
| EP | 1 026 861 A2 | 9/2000 |
| EP | 1 089 575 | 9/2000 |
| EP | 1 054 568 A2 | 11/2000 |
| EP | 1 161 819 B1 | 8/2006 |
| EP | 1 177 660 B1 | 8/2006 |
| EP | 1 135 905 B1 | 10/2006 |
| EP | 1 169 829 B1 | 10/2006 |
| EP | 1 169 816 B1 | 11/2006 |
| EP | 1 192 758 B1 | 2/2007 |
| EP | 1 755 295 A1 | 2/2007 |
| EP | 1 715 658 B1 | 10/2007 |
| EP | 1 371 246 B1 | 7/2008 |
| WO | WO 97/11563 | 3/1997 |
| WO | WO 97/33441 | 9/1997 |
| WO | WO 97/42774 | 11/1997 |
| WO | WO 97/42776 | 11/1997 |
| WO | WO 97/46045 | 12/1997 |
| WO | WO 98/28879 | 7/1998 |
| WO | WO 98/28885 | 7/1998 |
| WO | WO 98/28897 | 7/1998 |
| WO | WO 99/09759 | 2/1999 |
| WO | WO 99/16256 | 4/1999 |
| WO | WO 00/19758 | 4/2000 |
| WO | WO 00/22840 | 4/2000 |
| WO | WO 00/30369 | 5/2000 |
| WO | WO 00/31933 | 6/2000 |
| WO | WO 00/33519 | 6/2000 |
| WO | WO 00/35155 | 6/2000 |
| WO | WO 00/35156 | 6/2000 |
| WO | WO 00/54476 | 9/2000 |
| WO | WO 00/56032 | 9/2000 |
| WO | WO 00/60812 | 10/2000 |
| WO | WO 00/60814 | 10/2000 |
| WO | WO 00/60821 | 10/2000 |
| WO | WO 00/65785 | 11/2000 |
| WO | WO 00/76134 A1 | 12/2000 |
| WO | WO 01/11825 | 2/2001 |
| WO | WO 01/24499 | 4/2001 |
| WO | WO 01/37532 A2 | 5/2001 |
| WO | WO 01/82635 A1 | 11/2001 |
| WO | WO 01/93526 A2 | 12/2001 |
| WO | WO 02/07455 A1 | 1/2002 |
| WO | WO 02/056618 A2 | 7/2002 |

WO    WO 02/060192 A2    8/2002

OTHER PUBLICATIONS

Official Action for U.S. Appl. No. 11/184,632 (Sep. 26, 2008).
Official Action for U.S. Appl. No. 11/180,028 (Sep. 4, 2008).
Official Action for U.S. Appl. No. 11/184,629 (Sep. 2, 2008).
Official Action for U.S. Appl. No. 11/130,422 (Aug. 14, 2008).
Decision to grant a European patent pursuant to Article 97(1) EPC for European Patent No. 1314324 (Jul. 31, 2008).
Notice of Allowance and Fee(s) Due for U.S. Appl. No. 11/184,439 (Jul. 30, 2008).
Notice of Allowance and Fee(s) Due for U.S. Appl. No. 11/224,705 (Jul. 17, 2008).
Communication pursuant to Article 94(3) EPC for European Application No. 00920080.9 (Jun. 27, 2008).
Official Action for U.S. Appl. No. 11/282,966 (Jun. 23, 2008).
Communication pursuant to Article 94(3) EPC for European Application No. 02705919.5 (May 27, 2008).
Official Action for U.S. Appl. No. 11/180,028 (May 5, 2008).
Official Action in U.S. Appl. No. 11/184,632 (Apr. 25, 2008).
Interview Summary for U.S. Appl. No. 11/224,705 (Mar. 25, 2008).
Communication pursuant to Article 94(3) EPC for European Application No. 07119613.3 (Mar. 17, 2008).
Supplementary European Search Report for European Application No. 00920080.9 (Feb. 14, 2008).
Extended European Search Report corresponding to European Patent No. 07119613.3 (Nov. 30, 2007).
Notice of Allowance and Fee(s) Due for U.S. Appl. No. 10/403,460 (Nov. 2, 2007).
Official Action for U.S. Appl. No. 11/224,705 (Sep. 28, 2007).
Communication pursuant to Article 96(2) EPC for European Application No. 06005210.7 (Sep. 6, 2007).
Notice of Allowance and Fee(s) Due for U.S. Appl. No. 09/770,316 (Aug. 13, 2007).
Official Action for U.S. Appl. No. 10/403,460 (May 11, 2007).
Notice of Allowance and Fee(s) Due for U.S. Appl. No. 10/403,455 (May 9, 2007).
Communication pursuant to Article 96(2) EPC for European Application No. 06122282.4 (Apr. 11, 2007).
Communication pursuant to Article 96(2) EPC for European Application No. 00950411.9 (Mar. 2, 2007).
Extended European Search Report for European Patent Application No. 06122282.4 (Jan. 19, 2007).
Notice of Allowance and Fee(s) Due for U.S. Appl. No. 10/403,459 (Dec. 21, 2006).
Advisory Action for U.S. Appl. No. 09/543,135 (Dec. 13, 2006).
Official Action for U.S. Appl. No. 09/770,316 (Dec. 5, 2006).
Communication pursuant to Article 96(2) EPC in European Application No. 01928718.4 (Nov. 20, 2006).
Communication pursuant to Article 96(2) EPC in European Application No. 06005210.7 (Aug. 30, 2006).
Supplemental Notice of Allowability for U.S. Appl. No. 09/839,394 (Aug. 17, 2006).
Official Action for U.S. Appl. No. 09/543,135 (Aug. 16, 2006).
Official Action for U.S. Appl. No. 10/403,460 (Aug. 9, 2006).
Official Action for U.S. Appl. No. 10/403,459 (Aug. 9, 2006).
Official Action for U.S. Appl. No. 10/403,455 (Aug. 9, 2006).
Communication pursuant to Article 96(2) EPC in European Application No. 00950411.9 (Jun. 23, 2006).
Official Action for U.S. Appl. No. 09/543,135 (Jun. 19, 2006).
Extended European Search Report for European Appl. No. 06005210.7 (Jun. 6, 2006).
Advisory Action for U.S. Appl. No. 09/770,316 (Mar. 21 2006).
Notice of Panel Decision from Pre-Appeal Brief for U.S. Appl. No. 09/770,316 (Feb. 14, 2006).
Notice of Allowance and Fee(s) Due for U.S. Appl. No. 10/403,461 (Feb. 13, 2006).
Communication pursuant to Article 96(2) EPC in European Application No. 01939711.6 (Feb. 6, 2006).
Supplemental Notice of Allowability for U.S. Appl. No. 09/443,712 (Jan. 31, 2006).
Supplemental Notice of Allowability in U.S. Appl. No. 09/588,852 (Dec. 22, 2005).
Notice of Allowance and Fee(s) Due for U.S. Appl. No. 10/403,457 (Dec. 6, 2005).
Supplemental Notice of Allowability for U.S. Appl. No. 09/735,142 (Dec. 5, 2005).
Communication pursuant to Article 96(2) EPC in EP Patent Application No. 01989213.2 (Nov. 7, 2005).
Advisory Action for U.S. Appl. No. 09/543,135 (Sep. 21, 2005).
Official Action for U.S. Appl. No. 09/443,712 (Sep. 21, 2005).
Supplemental Notice of Allowability for U.S. Appl. No. 09/559,767 (Sep. 2, 2005).
Supplemental Notice of Allowability for U.S. Appl. No. 09/534,281 (Aug. 25, 2005).
Official Action for U.S. Appl. No. 09/770,316 (Jul. 27, 2005).
Notice of Allowance and Fee(s) Due for U.S. Appl. No. 09/768,881 (Jun. 2, 2005).
Official Action for U.S. Appl. No. 10/403,457 (May 19, 2005).
Official Action for U.S. Appl. No. 10/403,461 (May 17, 2005).
Notice of Allowance and Fee(s) Due for U.S. Appl. No. 09/537,835 (Apr. 19, 2005).
Official Action for U.S. Appl. No. 09/543,135 (Mar. 30, 2005).
Communication pursuant to Article 96(2) EPC for European Application No. 01989213.2 (Mar. 7, 2005).
Supplemental Notice of Allowability for U.S. Appl. No. 09/541,853 (Mar. 7, 2005).
Notice of Allowance in U.S. Appl. No. 09/588,852 (Mar. 2, 2005).
Notice of Allowance and Fee(s) Due for U.S. Appl. No. 09/618,807 (Feb. 25, 2005).
Notice of Allowance and Fee(s) Due for U.S. Appl. No. 09/735,142 (Feb. 14, 2005).
Notification of Transmittal of International Preliminary Examination Report for International Application No. PCT/US00/08837 (Feb. 7, 2005).
Notification of Transmittal of International Preliminary Report on Patentability for International Application No. PCT/US01/48269 (Jan. 11, 2005).
Official Action for U.S. Appl. No. 09/443,712 (Dec. 29, 2004).
Invitation pursuant to Article 96(2) and Rule 51(2) EPC for EP Application No. 00919979.5 (Dec. 16, 2004).
Official Action for U.S. Appl. No. 09/768,881 (Dec. 14, 2004).
Communication pursuant to Article 96(2) EPC for European Application No. 00939602.9 (Dec. 10, 2004).
Notice of Allowance and Fee(s) Due for U.S. Appl. No. 09/534,281 (Nov. 29, 2004).
Notice of Allowance and Fee(s) Due for U.S. Appl. No. 09/559,767 (Nov. 17, 2004).
Notice of Allowance and Fee(s) Due for U.S. Appl. No. 09/541,853 (Nov. 17, 2004).
Communication under Rule 112 EPC in European Application No. 01989213.2 (Nov. 17, 2004).
Communication pursuant to Article 96(2) EPC for European Application No. 00919614.8 (Nov. 10, 2004).
Official Action for U.S. Appl. No. 09/770,316 (Nov. 3, 2004).
Communication pursuant to Article 96(2) EPC for European Application No. 99965846.1 (Sep. 21, 2004).
Notice of Allowance and Fee(s) Due for U.S. Appl. No. 09/839,394 (Aug. 24, 2004).
Notice of Allowance and Fee(s) Due for U.S. Appl. No. 09/618,807 (Jul. 27, 2004).
Official Action for U.S. Appl. No. 09/541,853 (Jul. 15, 2004).
Pai, "In-Building Wireless: The Next Generation," TelephonyOnline.com, pp. 1-4 (Jun. 30, 2004).
Restriction and/or Election Requirement for U.S. Appl. No. 09/770,316 (Jun. 14, 2004).
Official Action for U.S. Appl. No. 09/537,835 (Jun. 4, 2004).
Official Action for U.S. Appl. No. 09/735,142 (May 27, 2004).
Official Action for U.S. Appl. No. 09/543,135 (May 13, 2004).
Official Action in U.S. Appl. No. 10/403,457 (May 6, 2004).
Communication pursuant to Article 96(2) EPC for European Application No. 00928464.7 (Apr. 16, 2004).
Official Action in U.S. Appl. No. 09/588,852 (Apr. 13, 2004).
Official Action for U.S. Appl. No. 09/559,767 (Feb. 26, 2004).

Official Action for U.S. Appl. No. 09/443,712 (Feb. 17, 2004).
Handa, "In Building Wireless: The Next Generation," TMCnet.com, pp. 1-7 (Feb. 12, 2004).
Official Action for U.S. Appl. No. 09/768,881 (Jan. 9, 2004).
Restriction Requirement in U.S. Appl. No. 09/588,852 (Dec. 30, 2003).
Official Action for U.S. Appl. No. 09/839,394 (Dec. 1, 2003).
Communication pursuant to Article 96(2) EPC for European Application No. 00919979.5 (Nov. 18, 2003).
Communication pursuant to Article 96(2) EPC for European Application No. 00919614.8 (Nov. 17, 2003).
Notification of Transmittal of International Preliminary Examination Report for International Application No. PCT/US02/01977 (Nov. 10, 2003).
Official Action for U.S. Appl. No. 09/541,853 (Oct. 31, 2003).
Official Action for U.S. Appl. No. 09/618,807 (Oct. 22, 2003).
Notification of Transmittal of International Preliminary Examination Report for International Application No. PCT/US02/01977 (Sep. 23, 2003).
Official Action for U.S. Appl. No. 09/537,835 (Sep. 16, 2003).
Fitchard, "A New Voice in the Boardroom," Wireless Review, pp. 1-3 (Sep. 1, 2003).
Official Action for U.S. Appl. No. 09/443,712 (Aug. 18, 2003).
Official Action for U.S. Appl. No. 10/403,457 (Aug. 13, 2003).
Official Action for U.S. Appl. No. 09/543,135 (Jul. 25, 2003).
Restriction and/or Election Requirement for U.S. Appl. No. 09/541,853 (Jul. 16, 2003).
Notification of Transmittal of the International Search Report or the Declaration in International Application No. PCT/US01/48269 (May 22, 2003).
Written Opinion for International Appliction No. PCT/US02/01977 (May 21, 2003).
Official Action for U.S. Appl. No. 09/768,881 (May 9, 2003).
Official Action for U.S. Appl. No. 09/618,807 (Apr. 15, 2003).
Official Action for U.S. Appl. No. 09/443,712 (Mar. 14, 2003).
Invitation to Pay Additional Fees for International Appication No. PCT/US01/48269 (Feb. 26, 2003).
Telcordia Technologies Specification of Signalling System No. 7, "Annex A: SS7 Message Priorities", GR-246-CORE, Issue 8, (Dec. 2003).
Nichols et al., "Definition of the Differentiated Services Field (DS Field) in the IPv4 and IPv6 Headers", Internet Engineering Task Force RFC 2474, pp. 1-20, (1998).
Almquist, "Type of Service in the Internet Protocol Suite", Internet Engineering Task Force RFC 1349, pp. 1-28, (Jul. 1992).
Internet Engineering Task Force RFC 791, University of Southern California, "Internet Protocol DARPA Internet Program Protocol Specification", pp. 1-45, (Sep. 1981).
Michael McGrew, "Transport SS7 Signaling Over IP", Lucent Technologies, Inc., pp. 1-8, (Nov. 1998).
Communication pursuant to Article 94(3) EPC for European Application No. 01 939 711.6 (Nov. 4, 2008).
Official Action for U.S. Appl. No. 11/282,966 (Mar. 11, 2009).
Notice of Allowance and Fee(s) Due for U.S. Appl. No. 11/224,705 (Feb. 24, 2009).
Comunication pursuant to Article 94(3) EPC for European Patent Application No. 00 920 080.9 (Feb. 16, 2009).
Notification of Transmittal of the International Search Report and the Written Opinion of the International Searching Authority, or the Declaration in International Application No. PCT/US05/23456 (May 10, 2006).
Restriction and/or Election Requirement for U.S. Appl. No. 09/443,712 (Jan. 29, 2003).
"Fixed Wireless Technology," ISP Planet, pp. 1-4 (May 14, 2002).
Notification of Transmittal of International Preliminary Examination Report for International Application No. PCT/US01/12922 (Apr. 3, 2002).
International Search Report for International Application No. PCT/US01/17483 (Mar. 25, 2002).
Written Opinion for International Application No. PCT/US01/12922 (Feb. 13, 2002).
Notice of Allowance and Issue Fee Due for U.S. Appl. No. 09/205,809 (Sep. 25, 2001).
Notification of Transmittal of International Preliminary Examination Report for International Application No. PCT/US00/11322 (Aug. 2, 2001).
Notification of Transmittal of International Preliminary Examination Report for International Application No. PCT/US00/08614 (Jul. 30, 2001).
Martinek, "Office on the Fly," Wireless Review, pp. 1-4 (Jul. 15, 2001).
"March Networks 3300 Integrated Communications Platform," Mitel Networks Corporation, pp. 1-34 (Jul. 2001).
Supplemental Notice of Allowability for U.S. Appl. No. 09/205,809 (May 23, 2001).
Notification of Transmittal of International Preliminary Examination Report for International Application No. PCT/US00/07876 (Mar. 27, 2001).
Notice of Allowance and Fees Due for U.S. Appl. No. 09/205,809 (Feb. 27, 2001).
Official Action for U.S. Appl. No. 09/205,809 (Jan. 3, 2001).
Sidebottom et al., "SS7 MTP3-User Adaptation Layer (M3UA)," Internet Draft, Network Working Group, pp. 1-79 (Nov. 2000).
Affidavit of Dr. Harry G. Perros (Oct. 11, 2000).
Notification of Transmittal of International Preliminary Examination Report for International Application No. PCT/US99/27572 (Oct. 6, 2000).
Notification of Transmittal of International Preliminary Examination Report for International Application No. PCT/US99/27397 (Oct. 5, 2000).
Stewart et al., "Stream Control Transmission Protocol," Request for Comments: 2960, Network Working Group, pp. 1-118, (Oct. 2000).
"Digital Cellular Telecommunications System (Phase 2+) (GSM); Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1-65 (Sep. 2000).
Sidebottom et al., "SS7 MTP3-User Adaptation Layer (M3UA)," Internet draft, , IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
International Search Report in International Application No. PCT/US00/15561 (Aug. 2, 2000).
Official Action for U.S. Appl. No. 09/205,809 (Jun. 22, 2000).
Loughney, "IP-Based Signaling Needs in Radio Access Networks," Internet draft, draft-loughney-sigtran-ip-ran-00.txt, IETF SIGTRAN Working Group, p. 1-14, (Jun. 16, 2000).
Swartz, "Ready, Set, Wireless Office!," Wireless Review, pp. 1-4 (Jun. 1, 2000).
"GPRS: General Packet Radio Service," Usha Communications Technology, pp. 1-23 (Jun. 2000).
"Telstra and Ericsson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality-Company Business and Marketing," Cambridge Telcom Report, pp. 1-4 (Apr. 24, 2000).
Interview Summary for U.S. Appl. No. 09/205,809 (Apr. 14, 2000).
Commonly-assigned, co-pending U.S. Appl. No. 09/543,135 for "System and Method for Routing Calls from a Voice Network to a Data Communications Network," (Unpublished, filed Apr. 5, 2000).
"Market and Development Agreement Targets Customers Looking for Ways to Become More Productive Through Convenient and Cost-Effective Communication," Ericsson Press Release, pp. 1-2 (Apr. 4, 2000).
Loughney et al., "SS7 SCCP-User Adaptation Layer (SUA)," Internet draft, draft-loughney-sigtran-sua-00.txt, IETF Engineering Task Force, p. 1-46, (Mar. 8, 2000).
Official Action for U.S. Appl. No. 09/205,809 (Feb. 2, 2000).
Sulkin, "Emerging Options for Wireless PBXs," Voice2000, pp. 1-8 (Feb. 2000).

Drzewianowksi, "WLANs—For the Picking," Communications Solutions™ Next-Gen Networks, pp. 1-9 (Jan. 2000).
"Universal Mobile Telecomunications System (UMTS); UTRAN lu Interface: General Aspects and Principles (3G TS 25.410 version 3.1.0 Release 1999)," ETSI, pp. 1-2 (Jan. 2000).
"The Wireless Business Connection," Second Quarter 2000 Report,. The Phillips Group—Infotech, pp. 1-9 (2000).
3rd Generation Partnership Project (3GPP), "Technical Specification Group Radio Access Network—UTRAN Overall Description," 3G TS 25.401 version 3.1.0, Release 1999, p. 1-34, (Dec. 17, 1999).
3rd Generation Partnership Project (3GPP), "Technical Specification Group Radio Access Network—UTRAN lu Interface: General Aspects and Principles," 3G TS 25.410 version 3.1.0, Release 1999, p. 1-23, (Dec. 12, 1999).
"Ericsson Announces General Availability of Its Mobile Advantage Wireless Office System," Ericsson Press Release, pp. 1-2 (Nov. 4, 1999).
Arango et al., "Media Gateway Control Protocol (MGCP), Version 1.0," Vertical Networks, RFC 2705, pp. 1-126 (Oct. 1999).
Ong et al., "Framework Architecture for Signaling Transport," Network Working Group, pp. 1-24 (Oct. 1999).
ITU-T Recommendation Q.2630.1 (Sep. 29, 1999).
O'Shea, "Mating Season," Telephony, p. 10-11, (Sep. 20, 1999).
"Corporate Offices to Go Wireless First Australian GSM on the Net Trial," Ericsson Press Release, pp. 1-3 (Aug. 11, 1999).
ITU-T Recommendation Q.2150.1 (Jun. 23, 1999).
"Ericsson Solution Chosen for World's First Combined DECT/GSM Communications Service," Ericsson, pp. 1-9 (Jun. 21, 1999).
Hamdi et al., "Voice Service Interworking for PSTN and IP Networks," IEEE Communications Magazine, p. 104-111, (Jun. 5, 1999).
Sprague et al., "Transport Adapter Layer Interface," Tekelec, p. 1-30, (May 28, 1999).
U.S. Appl. No. 60/132,552 for "Signal Transfer Point with Virtual Backplane" (May 5, 1999).
Lakshmi-Ratan, "The Lucent Technologies Softswitch-Realizing the Promise of Convergence," Bell Labs Technical Journal, p. 174-195, (Apr. 5, 1999).
Handley et al., "SIP: Session Initiation Protocol," Internet Draft, Network Working Group, pp. 1-141 (Mar. 1999).
Bressler, "SS7 Level Two Over IP," Nortel Networks, pp. 1-6 (Jan. 1999).
Johanson et al., "Mobile Advantage Wireless Office—A Digital Wireless Office System for TDMA/136 Networks," Ericsson Review No. 1, pp. 20-27 (1999).
"Enterprise IP Gateway," Ericsson, pp. 1-6 (1999).
"The Ericsson IPT System," Ericsson, pp. 1-8 (1999).
PCS Access Network Requirements: Interface Specification, Interface: Service Access Socket System Interface (SASSI), Version 01.01, Dec. 3, 1998 (Unpublished).
PCS Access Network Requirements: Product Specification, Network Element: Gateway Signal Transfer Point between CCS/SS7 and TCP-IP Networks (GW-STP-IP), Dec. 3, 1998 (Unpublished).
U.S. Appl. No. 60/110,398 for "Signaling Link with Inherent Redundancy," (Dec. 1, 1998).
"Wireless: Top Ericsson Executives Lay Out Corporate Vision, Unveil Strategy for the Enterprise Customer—Company Business and Marketing," Edge, On & About AT&T, pp. 1-5 (Nov. 30, 1998).
Glaude et al., "SS7 to IP Signaling Gateway Transport Architecture", Internet Engineering Task Force, pp. 1-39 (Nov. 27, 1998).
Cuervo et al., "SSS-Internet Interworking—Architectural Framework," pp. 1-9 (Jul. 1998).
Weekly Status Report for week of Jul. 13-17, 1998 (Unpublished).
Weekly Status Report for the weeks of Jul. 6-10, 1998 (Unpublished).
Weekly Status Report for week of Jun. 15-18, 1998 (Unpublished).
"Ericsson Wireless Office Services to Provide Digital System Through AT&T Wireless Services," Ericsson Press Release, pp. 1-2 (Apr. 17, 1998).
Tekelec, "Eagle® Feature Guide," PN/9110-1225-01, (Jan. 1998).
O'Shea, "The Network That's Never Done," Telephony, p. 38-43, (Sep. 15, 1997).
Tekelec, "Eagle® STP Platform," 908-0134-01, (1997).
Tekelec, "STP Lan Interface Feature," 908-0134-01, (1997).
Tekelec, "STP Database Transport Access Feature," 908-0136-01, (1997).
Tekelec, "STP X.25 to SS7-IS.41 Protocol Conversion Feature," 908-0135-01, (1997).
Tekelec, "STP ANSI-ITU Gateway Feature," 908-0133-01, (1997).
Tekelec, "SS7-Frame Relay Access Device SS7 Protocol Information Translator," 908-0167-01, (1997).
Snyder, "Rerouting Internet Traffic Jams," Telephony, p. 12, (Nov. 11, 1996).
Snyder, "Branded With Optics," Telephony, p. 49-50, (Jul. 22, 1996).
Anonymous, "Around the Loop," Telephony, p. 26, (Jul. 22, 1996).
Douglas E. Comer, "Internetworking with TCP/IP," Principles, Protocols, and Architecture, 3rd ed., Prentice Hall (New Jersey), p. 6-8, (1995).
Woods, "Fresno Bee Still Buzzing About Wireless," TechNews, pp. 1-2 (1995).
Bellcore, "Signaling Transfer Point (STP) Generic Requirements," GR-82-CORE, Issue 1 (Jun. 1994).
Yang et al., "The Design and Implementation of a Service Logic Execution Environment Platform," IEEE, pp. 1911-1917 (1993).
Zaharychuk et al., "Gateway Signal Transfer Points: Design, Services and Benefits," IEEE, pp. 223.2.1-223.2.8, (May 29, 1990).
El-Toumi et al., "Interconnecting SS7 Signaling Networks," AT&T Bell Laboratories, IEEE, pp. 589-593 (1990).
Ex Parte Remark, 1990 WL 354512 (Bd.Pat.App. & Interf. 1990).
Bootman et al., "Generic Building Blocks for the Telecommunications Management Network," IEEE, p. 6.1.1-6.1.5, (1988).
Bootman, "Intelligent Network Services Using a Service Switching Node," IEEE, p. 40.7.1-40.2.4, (1988).
Buckles, "Very High Capacity Signaling Transfer Point For Intelligent Network Services," IEEE, p. 40.2.1-40.2.4, (1988).
*Henry Mfg. Co. Inc. v. Commercial Filters Corp*, 350 F.Supp. 1015 (S.D. Indiana 1971).
"teleSys Announces the Compatibility of Ericsson's Mobile Advantage Wirelss Office and teleSys' MACH7-IP Gateway," teleSys Software—Press Release, pp. 1-2 (Publication Date Unknown).
Affidavit of David M. Sprague filed in commonly-assigned, co-pending U.S. Appl. No. 09/443,712 (Unpublished).

\* cited by examiner

| BIT# | 0 | 1 | 2 | 3 | 4 | 5 | 6 | 7 |
|------|---|---|---|---|---|---|---|---|
| | PRECEDENCE | | | D | T | R | | |

| BIT# | 0 | 1 | 2 | 3 | 4 | 5 | 6 | 7 |
|------|---|---|---|---|---|---|---|---|
| | PRECEDENCE | | | TOS | | | | MBZ |

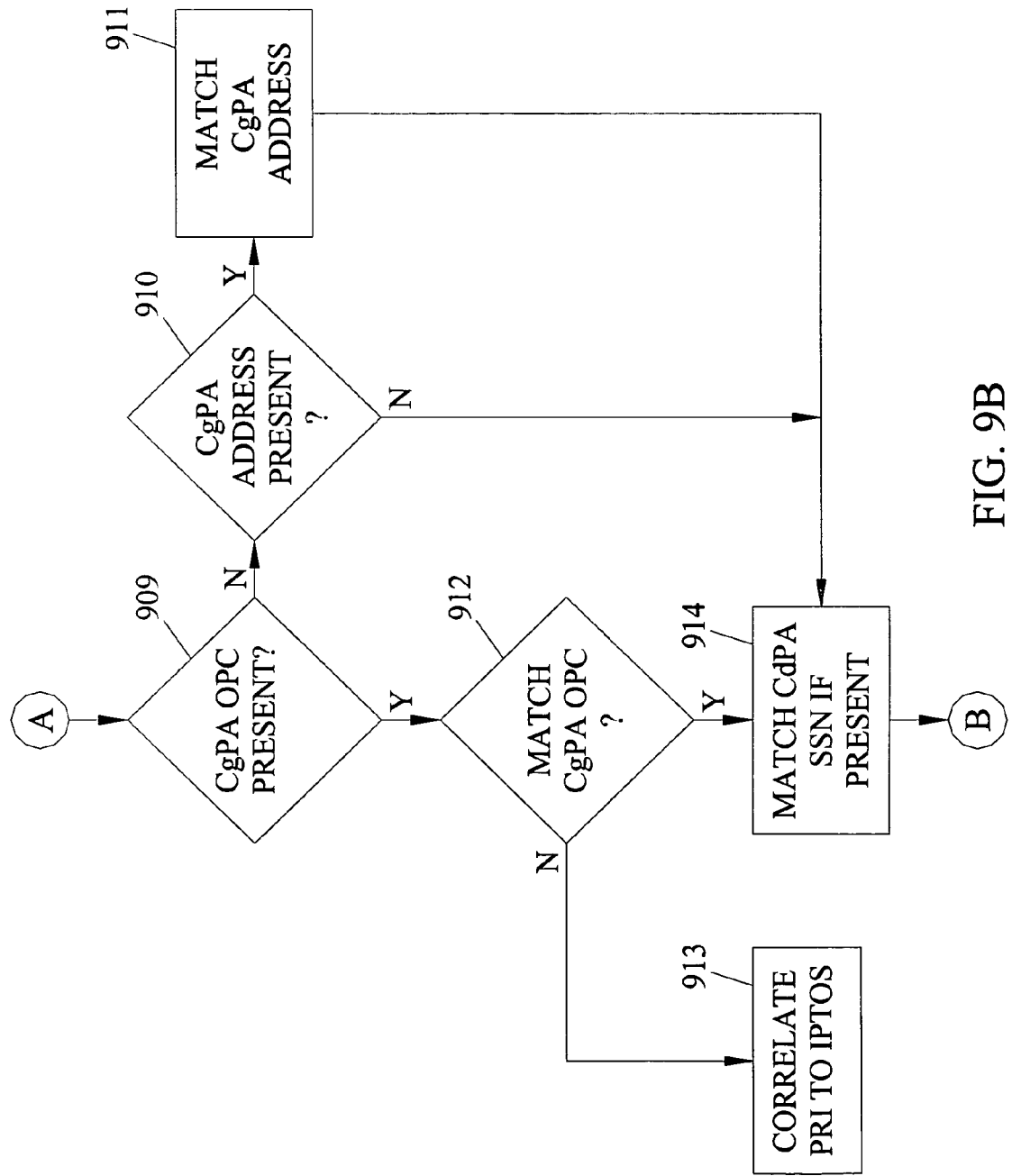

METHODS AND SYSTEMS FOR AUTO-CORRELATING MESSAGE TRANSFER PART (MTP) PRIORITY AND INTERNET PROTOCOL (IP) TYPE OF SERVICE IN CONVERGED NETWORKS

TECHNICAL FIELD

The present invention related to determining message priority in converged networks. More particularly, the present invention provides a system and method for setting the priority of a transport packet based on parameters of a message being transported.

BACKGROUND ART

Signaling system number 7 (SS7) is widely used as the signaling protocol in telecommunication networks. Each SS7 message is assigned one of four congestion priorities, which may be used to determine how each message is handled based on the current capacity of each signaling route. Typically, user messages, such as those for call setup and teardown, are assigned a lower priority than network management messages.

In converged networks, portions of the network use the Internet protocol (IP) to transport signaling messages, while other portions of the network use SS7 to transport signaling messages. For example, IP may be used for message transfer between signal transfer points (STP) in the network, and SS7 may be used to communicate with endpoints, or vice-versa. In one implementation, an STP may receive an SS7 message from a service switching point (SSP), encapsulate the SS7 message in an IP packet, and transfer the received SS7 message to another STP using IP. However, once the SS7 message is encapsulated in an IP packet, the priority level of the SS7 message cannot be determined by examining the IP packet header. In the event that the IP network becomes congested, the delivery of high priority SS7 messages may be delayed since all IP encapsulated SS7 messages may be treated with the same priority level.

In addition, most SS7 user messages are considered low priority and are treated the same. However, users may wish to ensure that their messages are handled in a timely fashion, especially when the network is experiencing abnormal conditions, such as congestion. While a user may be willing to pay for preferred service, there is currently no provision to enable tiers of service in an SS7/IP network.

Accordingly, there is a need to provide a system and method to assign a priority to an IP packet based on the priority of the SS7 message that is encapsulated in the packet.

There is also a need to provide a system and method to indicate a desired level of service for an SS7 user message and reflect the desired level of service in the IP packet in which the SS7 user message is encapsulated.

DISCLOSURE OF THE INVENTION

Methods and systems for automatically correlating signaling message priority and IP priority are disclosed. A priority level of a signaling message may be determined based on a priority parameter in the signaling message or a user based priority. The signaling message is encapsulated in an IP packet. A priority level in the IP packet is set based on the priority level determined for the signaling message.

In accordance with another aspect of the invention, a signaling gateway includes a first interface module operatively coupled to a first network. The first interface module is capable of receiving a signaling message from the first network. The first interface module routes the signaling message to a second interface module associated with an outbound signaling link. The second interface module includes a priority determination process for determining a priority of the message in a first protocol and mapping the priority in the first protocol to a second protocol, the second interface module may encapsulate the received signaling message in a packet of the second protocol, set the priority information in the packet, and transmit the packet on the second network.

Accordingly, it is an object of the invention to provide methods and systems for assigning a priority to an IP packet based on a priority parameter of the signaling message that is encapsulated in the packet.

It is another object of the invention to provide methods and systems for determining priority of a signaling message based on a calling or called party parameter in the signaling message and for setting the priority of an IP packet that encapsulates the signaling message based on the priority determined for the signaling message.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

FIGS. 9A-9C are a flow diagram of an exemplary process for correlating signaling priority and IP type of service.

DETAILED DESCRIPTION OF THE INVENTION

Figure 1:
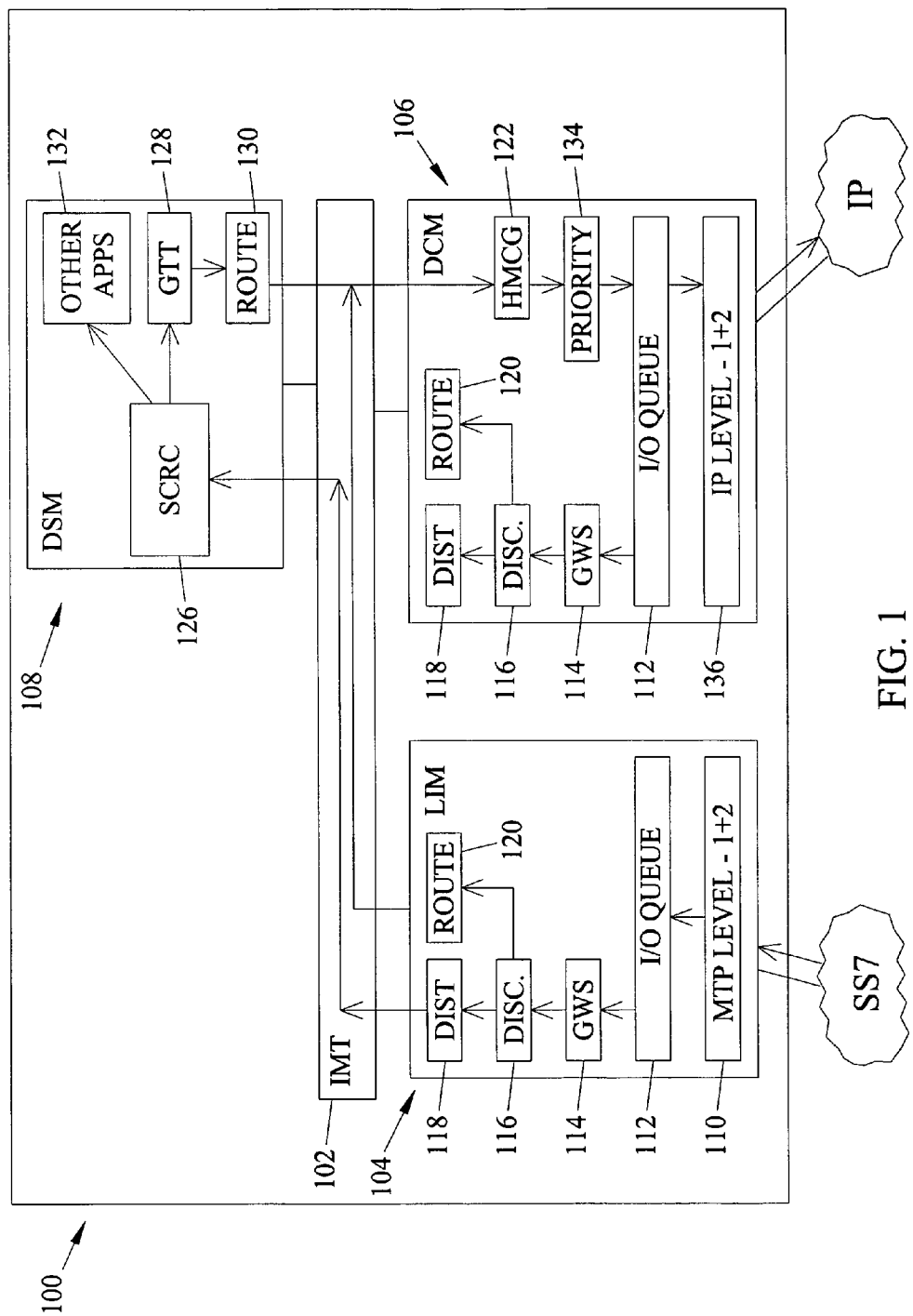
FIG. 1 is a block diagram illustrating an exemplary internal architecture of a signaling gateway (SG) according to an embodiment of the present invention.

The present invention includes methods and systems for correlating SS7 message priority to IP type of service parameters. In one implementation, the methods and systems for correlating priority may be implemented in a signaling message routing node, such as a signal transfer point or a signaling gateway. FIG. 1 is a block diagram illustrating an exemplary internal architecture of a signaling gateway (SG) 100 according to an embodiment of the present invention. SG 100 may include signaling system no. 7 (SS7) signal transfer point (STP) functionality for processing SS7 messages and Internet protocol (IP) functionality for processing IP messages. In a particular embodiment, SG 100 may comprise an Eagle® SS7/IP gateway available from Tekelec of Calabasas, Calif.

In the illustrated embodiment, SG 100 includes an interprocessor message transport (IMT) bus 102, which provides a reliable transport mechanism for transporting messages between modules in SG 100. IMT bus 102 may include a dual-ring, counter-rotating bus so that traffic may be re-routed in response to a module failure. A number of cards or processing modules may be coupled to IMT bus 102. These cards or processing modules may include an SS7-capable link interface module (LIM) 104, an IP-capable data communication module (DCM) 106, and a database services module (DSM) 108. Each of the modules may be physically connected to IMT bus 102 such that signaling and other messages may be routed internally between all active cards or modules.

As used herein the term "module" may include a hardware component, a software component, a firmware component or any combination thereof. For example, a module may be a chip, such as an ASIC, designed to perform a specific function. Alternatively, a module may be a part of a computer program that performs a specific function or a module may be a microprocessor programmed to perform a specific function.

In one implementation, each module includes a printed circuit board having an application processor and a communications processor mounted thereon. The application processor on each module may be programmed to perform a telecommunications processing function. For example, the application processor on database services module 108 may be configured to provide database services, such as global title translation (GTT). The communications processor on each module may be programmed to perform link-level communications with other modules via IMT bus 102.

For simplicity of illustration, only single LIM, DCM, and DSM cards are included in FIG. 1. However, it should be appreciated that the distributed, multi-processor architecture of the SG node 100 facilitates the deployment of multiple LIM, DCM, DSM and other cards, all of which may be simultaneously connected to and communicating via IMT bus 102.

Focusing now on the functions of LIM card 104, in the illustrated embodiment, LIM 104 includes a number of sub-components including an SS7 MTP level 1 and 2 process 110, an I/O buffer or queue 112, a gateway screening (GWS) process 114, an SS7 MTP level 3 discrimination process 116, a distribution process 118, and a routing process 120. MTP level 1 and 2 process 110 provides the facilities necessary to send and receive digital data over a particular physical medium. MTP level 1 and 2 process 110 also performs error detection, error correction and sequenced delivery of SS7 message packets from the SS7 network. I/O queue 112 provides for temporary buffering of incoming and outgoing signaling message packets. GWS process 114 examines received message packets and determines whether the messages should be allowed into SG 100 for processing and/or routing. Gateway screening may include examining the destination point code of the received MSU to determine whether the MSU is to be allowed into a network for which SG 100 routes messages.

Discrimination process 116 performs a discrimination function, effectively determining whether an incoming SS7 message packet requires internal processing or is simply to be through-switched, i.e., routed to another node. This determination may be made by examining a destination point code in the message. If the destination point code is set to the point code of routing node 100, discrimination process 116 may determine that the message requires internal processing. If the destination point code is not set to the point code of routing node 100, discrimination process 116 may determine that the message is required to be through-switched.

In addition to examining the destination point code in a received message, discrimination process 116 may also examine the service indicator in a message to determine whether the message is an SCCP message. If the destination point code in the message is set to the point code of routing node 100 and the service indicator indicates that the message is an SCCP message, discrimination process 116 may forward the message to distribution process 118. Distribution process 118 handles the internal routing of SS7 message packets that require additional processing prior to final routing. If discrimination process 116 determines that a message should be through switched, discrimination process 116 forwards the message to routing process 120. Routing process 120 routes signaling messages to the appropriate outbound signaling links based on destination point codes in the messages.

Database services module (DSM) 108 receives SS7 message packets from the distribution process 118 on the LIM 104. In the illustrated embodiment, DSM 108 includes a signaling connection routing controller (SCRC) 126 that is responsible for routing SCCP messages to the appropriate application on the DSM 108. For example, SCCP messages requiring global titled translation would be routed from the SCRC 126 to the global title translation (GTT) application 128. As is known to the art, global title translation involves resolving a called party address to the point code and subsystem number of an intermediate or final destination. Once the point code is determined, the message is sent to the routing application 132 for delivery to the processing module associated with the outbound signaling link, such as DCM 106. It should be appreciated that the SCRC 126 may direct SCCP messages to other applications 130 on the DSM 108, as well. Examples of other SCCP applications that may be provided by DSM 108 include mobile application part (MAP) screening, G-FLEX™ service, and G-PORT™ service. MAP screening involves screening of messages based on MAP parameters in the message, e.g., to control routing of messages at the MAP level. G-FLEX™ is a feature available on STPs manufactured by Tekelec of Calabasas, Calif. for translating called party information in mobile signaling messages to point codes of mobile services nodes, such as home location registers (HLRs) and short message service centers (SM-SCs). G-PORT™ is a feature available on STPs available from Tekelec of Calabasas, Calif. for relaying mobile signaling messages relating to home HLRs for calls to ported-in subscribers and for responding on behalf of a home network HLR for ported-out subscribers.

Data communication module (DCM) 106 converts incoming IP-encapsulated SS7 messages into SS7 format and encapsulates outgoing SS7 messages in IP packets. In the illustrated embodiment, DCM 106 includes an HMCG process 122 that is responsible for monitoring congestion on the associated DCM linksets and internally communicating this link congestion information to peer processes on other modules via IMT bus 102.

DCM 106 may also include a priority determination process 134. As discussed in greater detail below, priority determination process 134 may determine the priority of an outgoing SS7 message based on message parameters, such as originating point code (OPC), calling party address (CgPA) OPC, CgPA global type address (GTA), and subsystem number (SSN), or based on MTP level 3 priority parameters included in the message. The message priority determined by the priority determination process 134 may be used to place the outgoing message in I/O queue 112. As discussed in greater detail below, the determined priority may also be used by the IP process 126 to set the values of the type of service octet of the IP header, and in particular the precedence bits in the type of service fields.

As the SS7 communication protocol and the IP communication protocol are not inherently compatible, all SS7 message packets that are to be sent into the IP network are first encapsulated within an IP routing envelope prior to transmission over the IP network and decapsulated before being transmitted over the SS7 network. This IP encapsulation and decapsulation is performed by IP process 136. IP process 136 may include physical layer functionality, network layer functionality, transport layer functionality, and transport adapter layer functionality. The physical layer functionality may include any suitable physical layer function for communicating IP packets over an underlying network. In one implementation, the physical layer functionality may include Ethernet functionality. The network layer functionality may include IP functionality. The transport layer functionality may include any suitable transport layer for reliable, stream-oriented delivery of signaling messages. Exemplary transport layer protocols suitable for use with embodiments of the present invention include TCP, UDP, and SCTP. The transport adapter layer functionality may include TALI, SUA, M2PA, M3UA, or other suitable transport adapter layer protocols, such as SIP, as described in the correspondingly named IETF Internet drafts and RFCs.

In addition to forwarding outbound messages over an IP network, DCM 106 receives inbound IP messages. In one implementation, DCM 106 receives IP encapsulated messages. IP process 136 may remove the IP and transport layers and any transport adapter layers from each incoming SS7 message. The message is then passed up the MTP stack and processed in a manner similar to SS7 messages received by LIM 104. In the illustrated example, DCM 106 includes gateway screening process 114, discrimination process 116, distribution process 118, and routing process 120. These processes perform the same functions as the correspondingly numbered processes described above with regard to LIM 104.

As previously noted, each SS7 message is assigned one of four priority levels. The priority of an SS7 message may be determined by examining the two priority bits in the Service Indicator Octet (SIO) of the SS7 message. These priority bits are set in accordance with the message priority, as defined by American National Standards Institute (ANSI) TI. III. 5, Annex A, which is reproduced in pertinent part at the end of the Detailed Description of the Invention. The message priority may also be determined in the SCCP layer using, for example, the importance field.

If the capacity of each signaling route is exceeded, procedures may be implemented that limit signaling traffic by selectably controlling the delivery of messages according to the priority of each message. For example, messages having a priority level that is lower than the current congestion level may be discarded. Thus, the priority of a message may determine the timeliness of the delivery of the message or whether the message is delivered at all.

Figure 2:
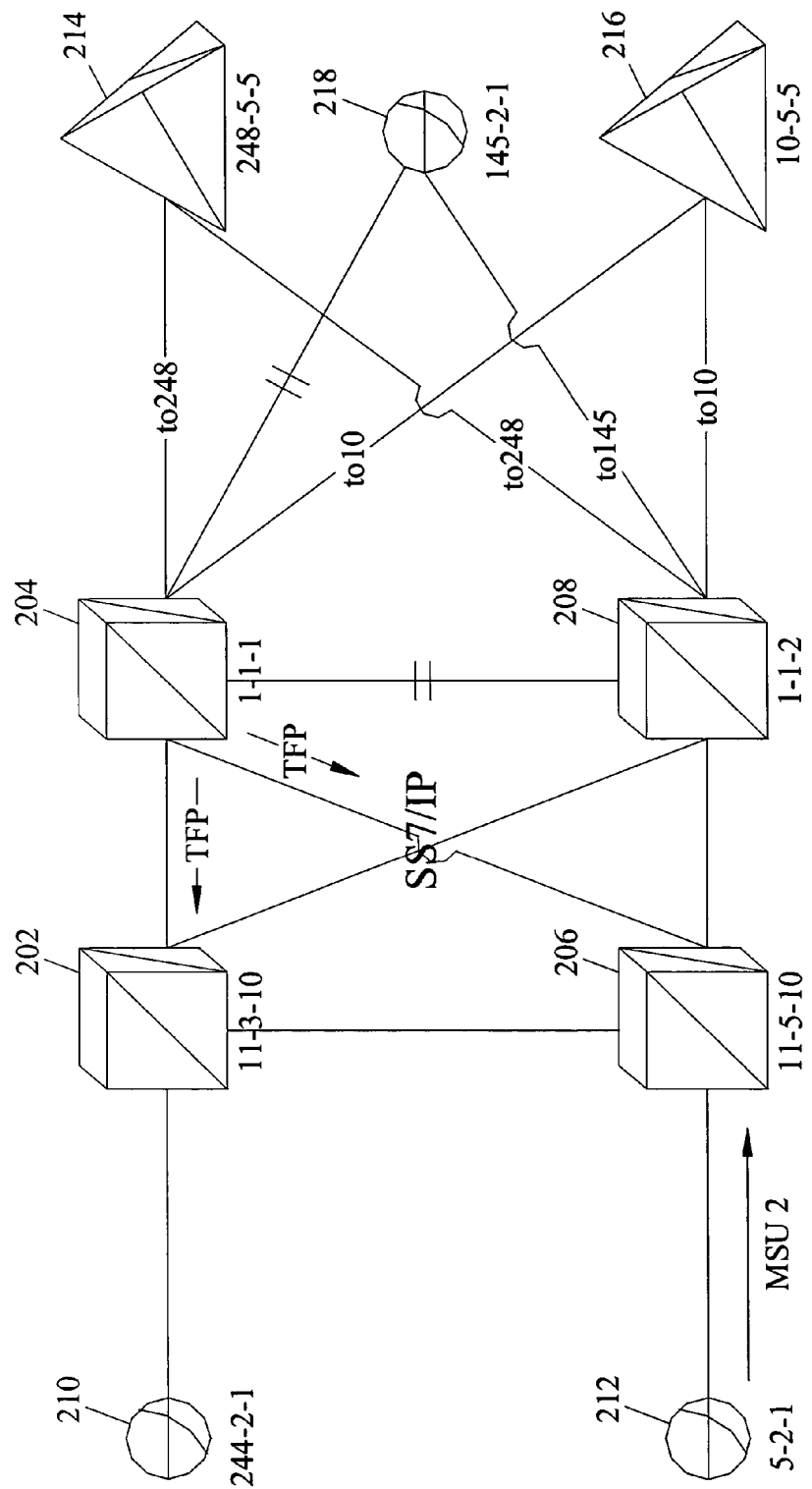
FIG. 2 is a diagram of an exemplary converged network.

FIG. 2 is a diagram of an exemplary converged network. The network includes four STPs 202, 204, 206, 208 interconnected by an IP network. Service switching point (SSP) 210 is connected to STP 202 by a conventional SS7 link. Similarly, SSP 212 is connected to STP 206 by a conventional SS7 link. Signal control points (SCPs) 214 and 216 are each connected to STPs 204 and 208 by SS7 links. Likewise, SSP 218 is connected to STPs 204 and 208 by an SS7 link.

As indicated by the broken signaling links in FIG. 2, STP 204 is unable to reach SSP 218. In response, STP 204 may broadcast a transfer prohibited signal (TFP) to adjacent nodes in the network, such as STPs 202, 206, and 208. The TFP message has a priority of level 3. However, once the TFP message is encapsulated in an IP packet, the message is treated as having the same priority as all of the other IP packets being transmitted. If the routers inside the IP network become congested, they may discard important SS7 signaling messages while processing lower priority SS7 or other IP traffic that the carrier may consider to be of lesser importance. As a result, other nodes in the network will not be aware of the condition of the links between STP 204 and SSP 218 and may continue transmitting messages to STP 204 destined for SSP 218 that STP 201 may not be able to deliver. These messages may be discarded once the message queues of STP 204 become full.

In accordance with one aspect of the invention, the priority of the SS7 message is mapped to the type of service (TOS) octet of the IP routing envelope used to encapsulate the SS7 message before it is transmitted over the IP network. In particular, the value of the precedence field, which denotes the importance or priority of the IP datagram, may be set according to the corresponding MTP priority value.

It should be appreciated that the type of service octet in the IP header has various definitions as described in, for example, Internet Engineering Task Force (IETF) RFC 791, RFC 1349, and RFC 2474. Although each of these documents define portions of the type of service octet differently, the three precedence bits appear in the same location and are consistently defined. For example, RFC 2474 redefines the TOS octet as a differentiated services code point. The first three bits define a class selector code point (CSCP), which designates the per-hop behavior of the packet. The CSCP is designed to backward compatible with the precedence field of the TOS octet.

Figures 3, 4, 5:
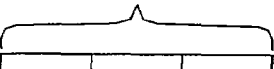
FIG. 3 is a diagram of the type of service field as defined by RFC 791.
FIG. 4 is a diagram of the type of service fields as defined by RFC 1349.
FIG. 5 is a diagram of the differentiated services (DS) field as defined by RFC 2474.

FIG. 3 is a diagram of the type of service octet as defined by RFC 791. Bits 0, 1, and 2 are indicated as the precedence field. RFC 791 defines eight levels of precedence, with routine messages having the lowest precedence and network control messages having the highest precedence. Bits 3, 4, and 5 are used to indicate a desired type of service in terms of delay, throughput, and reliability, as shown in Table 1.

TABLE 1

| Bit | Description | Parameters |
| --- | --- | --- |
| 3 | Delay (D) | 0 = Normal Delay |
|  |  | 1 = Low Delay |
| 4 | Throughput (T) | 0 = Normal Throughput |
|  |  | 1 = High Throughput |
| 5 | Reliability (R) | 0 = Normal Reliability |
|  |  | 1 = High Reliability |

FIG. 4 is a diagram of the type of service field as defined by RFC 1349. As previously indicated, bits 0, 1, and 2 are the precedence bits. Bits 3-6 define the desired type of service as shown in Table 2.

TABLE 2

| Bit | | | | Description |
| --- | --- | --- | --- | --- |
| 3 | 4 | 5 | 6 |  |
| 1 | 0 | 0 | 0 | Minimize Delay |
| 0 | 1 | 0 | 0 | Maximize Throughput |
| 0 | 0 | 1 | 0 | Maximize Reliability |
| 0 | 0 | 0 | 1 | Minimize Monetary Cost |
| 0 | 0 | 0 | 0 | Normal Service |

RFC 1349 defines the type of service field as a single enumerated value rather than as a set of independently definable bits. For example, the type of service field as defined by RFC 791 permits a user to select more than one type of service parameter (e.g., low delay and high throughput). In contrast, the type of service field as defined by RFC 1349 does not define each type of service bit independently. Thus, it is not possible to select more than one type of service parameter.

FIG. 5 is a diagram of the differentiated services (DS) field as defined by RFC 2474. Bits 0-5 are defined as a differentiated services code point (DSCP). The DSCP is used to select the per-hop behavior (PHB) that a packet experiences at each node. Bits 6 and 7 are currently unused and are ignored by differentiated services compliant nodes when determining the PHB to apply to the received packet. Bits 0, 1, and 2 are defined as a class selector code point (CSCP). The CSCP field is designed to be backwards compatible with the precedence field in the TOS octet. Therefore, it is possible to map the CSCP to the PHB irrespective of bits 3-5 of the DSCP field to yield a network that is compatible with IP precedence use. For example, a DSCP of "001010" could map to the same PHB as a DSCP of "001000".

In accordance with one aspect of the invention, the message priority of various protocol levels may be correlated or modified to synchronize the message priority fields so that the message gets equal treatment at various protocol levels. Although the embodiments of the present invention are described in relation to SS7, most signaling protocols carry a field to designate the priority of the message. Thus, the invention should not be limited to the SS7 protocol.

In typical implementations, buffers for the different protocol layers are independent of each other. Therefore, there is a need to make sure that the message priorities are equivalent at different protocol layers. In accordance with one aspect of the invention, the message priority of the IP layer is correlated with the message priority at the signaling layer. Table 3 shows an exemplary mapping of MTP priority to IP priority.

TABLE 3

| MTP Priority | RFC 791 | | | | RFC 1349 | | RFC 2474 |
|---|---|---|---|---|---|---|---|
| | Precedence | D | T | R | Precedence | TOS | DSCP |
| 0 | 001 | 0 | 1 | 1 | 1 | 0010 | 001xxx |
| 1 | 010 | 0 | 1 | 1 | 2 | 0010 | 010xxx |
| 2 | 011 | 0 | 1 | 1 | 3 | 0010 | 011xxx |
| 3 | 100 | 0 | 1 | 1 | 4 | 0010 | 100xxx |

It should be appreciated that the priority levels shown in Table 3 may be configurable by the user so that unique network translation schemes may be implemented. The capability of setting the priority of the IP packet may be provided for through-switched traffic as well as global title translation traffic, and may be set on the outbound link prior to transmission.

As previously noted, most SS7 user messages, such as SCCP, ISUP, TCAP, or MAP messages, are considered low priority and network resources or user messages are allocated on a first come, first served basis. Thus, as network resources become unavailable, for example, due to congestion, low priority user messages are frequently discarded in favor of higher priority network management messages.

Figure 6:
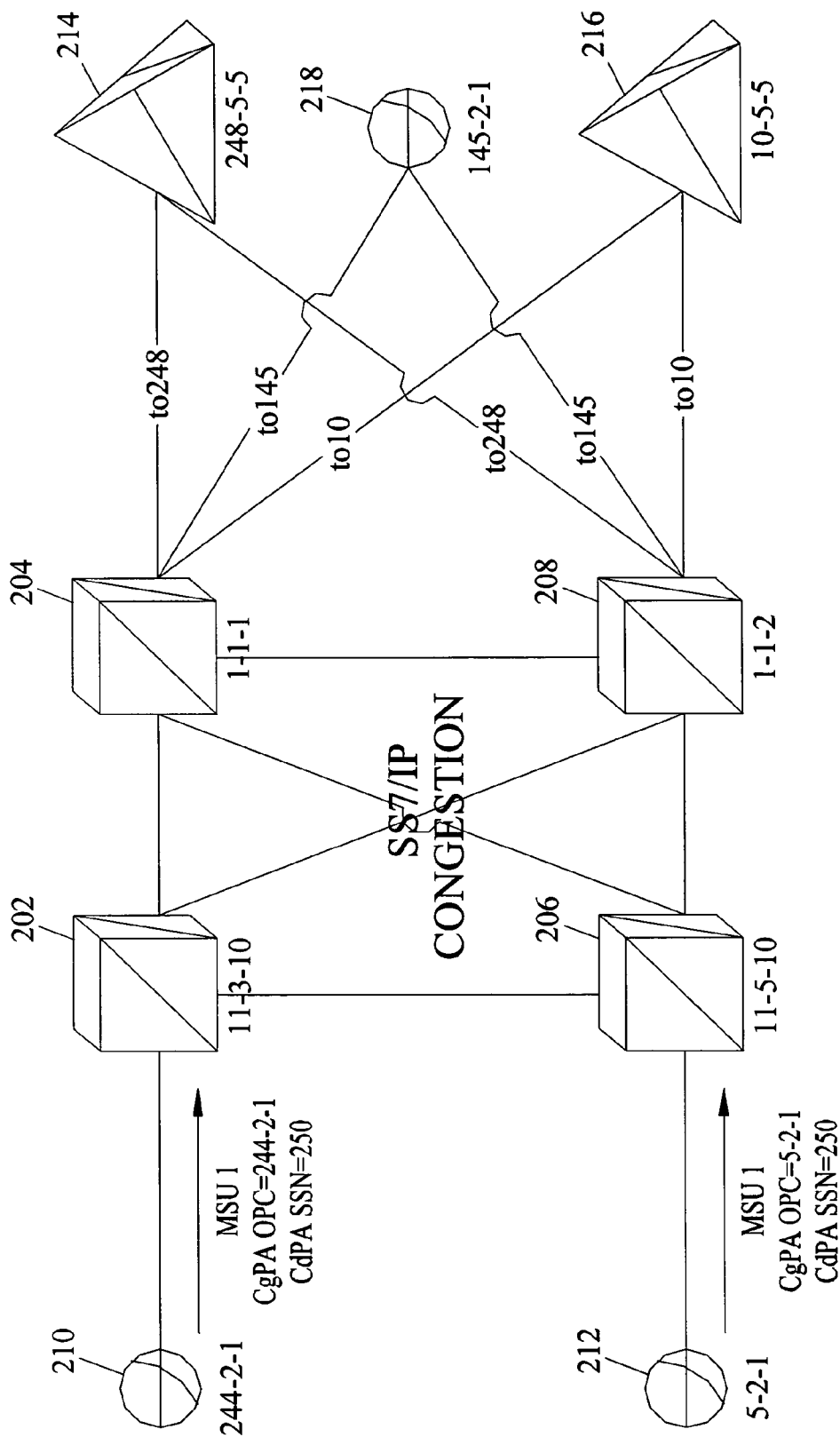
FIG. 6 is a diagram of an exemplary converged network.

FIG. 6 is a diagram of an exemplary converged network. The network components are described above with respect to FIG. 2 and a description thereof need not be repeated here. The network shown in FIG. 6 is experiencing congestion at the IP layer. A first message is being sent from SSP 210 toward STP 202, and a second message is being sent from SSP 212 toward STP 206. Upon receiving the message, the respective STP processes the received message and determines to which node the message should be forwarded. Each message is placed in the I/O queue of the respective STP for transmission across the IP network to the next node. As previously discussed, the MTP priority of messages encapsulated in IP packets may be reflected in the type of service octet of the IP packet. However, since most user traffic has a low priority, it is likely that at least some of the packets carrying user messages are being discarded. Thus, the operator of the SS7/IP network may desire to specify a particular signaling priority and/or IP TOS based upon who is sending the message, thereby providing a more through class of service to the end user.

Figure 7:
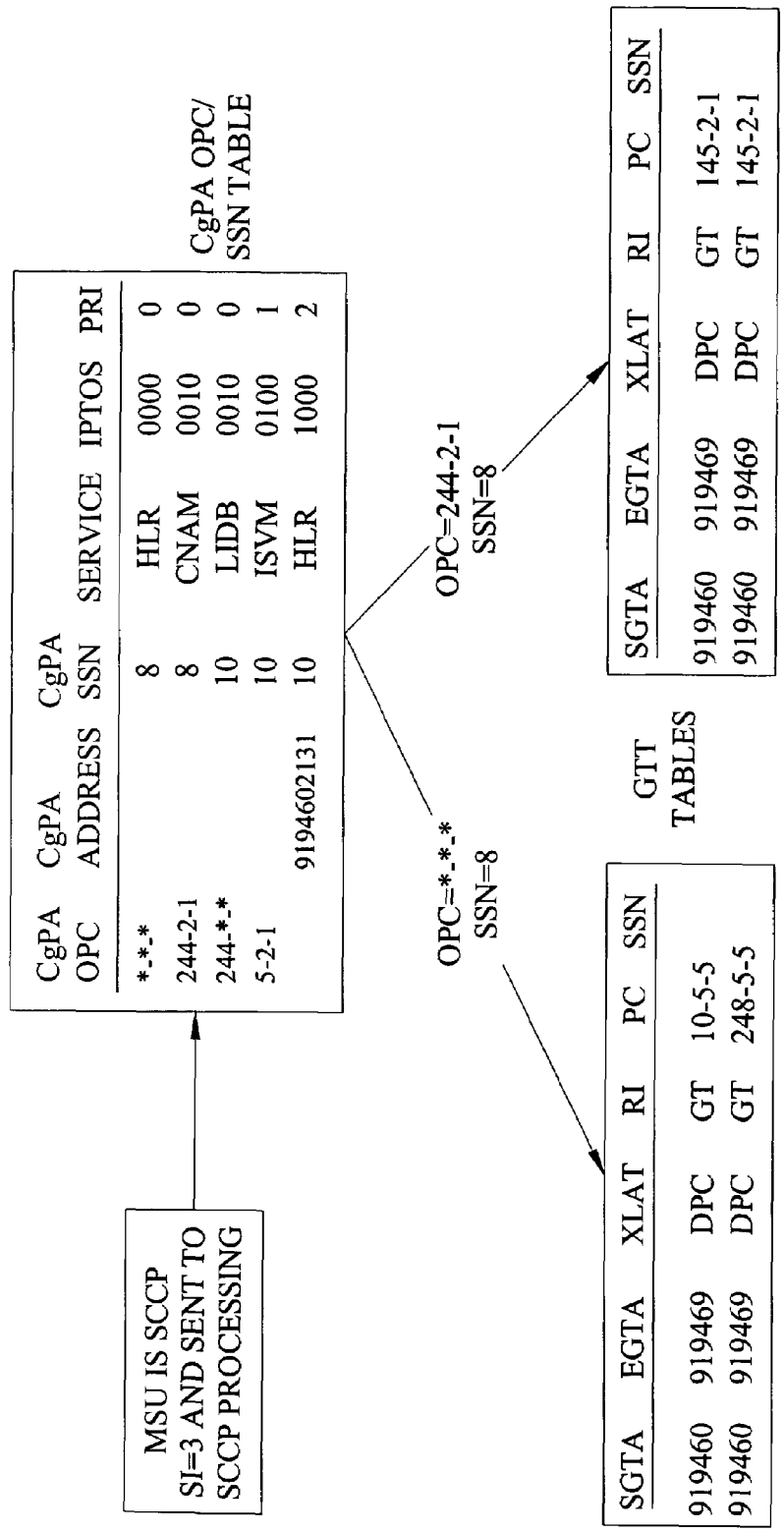
FIG. 7 depicts exemplary message parameters for ANSI formatted messages.
Figure 8:
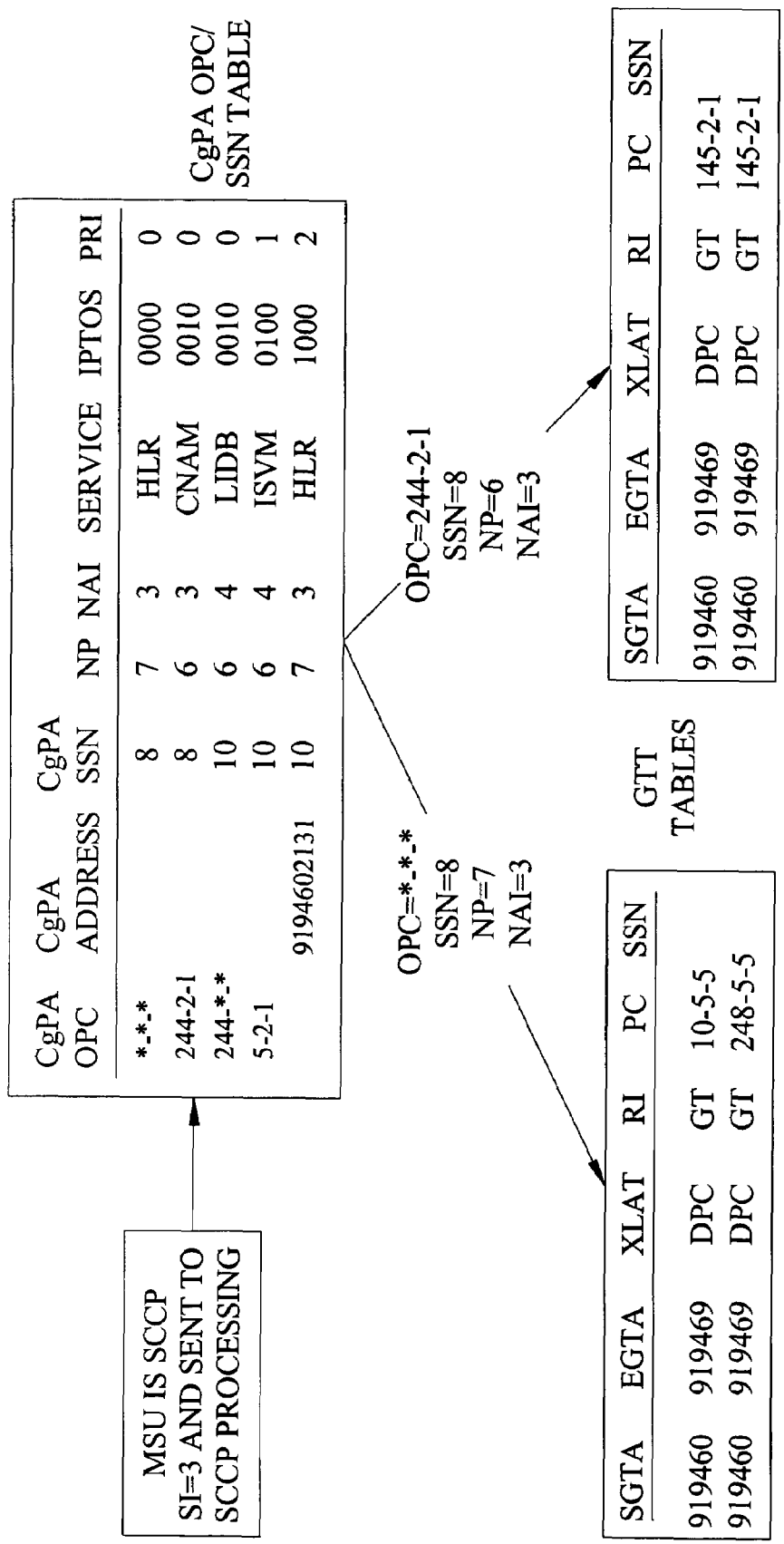
FIG. 8 depicts exemplary message parameters for ITU formatted messages.

In accordance with another aspect of the invention, the originator's SS7 parameters are correlated to the message priority at the signaling layer as well as the message priority of the IP layer. In one embodiment of the invention, the originator's originating point code (OPC), calling party address (CgPA) OPC, and CgPA global type address (GTA) are used to determine the priority of the message. FIGS. 7 and 8 are exemplary global title translation database implementations for MTP priority/IP TOS correlation of SS7 signaling messages. FIG. 7 depicts exemplary message parameters for ANSI formatted messages. FIG. 8 depicts exemplary message parameters for ITU formatted messages. GTT databases may be implemented in any of the STP's in FIG. 6. For example, any of the STPs illustrated in FIG. 6 may have an internal structure similar to that illustrated in FIG. 1. In such a structure, the GTT and SCCP-parameter-based priority tables illustrated in FIGS. 7 and 8 may be implemented in GTT database 128 on DSM card 108. In such an implementation, priority determination may be performed on DSM 108. DSM 108 may encode priority information in the IMT message sent to DCM 106. Priority determination process 134 may use this information to set the IP TOS octet in the outbound message.

When the first message is processed by STP 202, it may be forwarded to the DSM 108 for global title translation and a determination of the user priority. As shown in FIG. 7, an SCCP message with a CgPA OPC of 244-2-1 and CdPA SSN of 8 will have a priority set to zero but the IP TOS is set to 0010 (maximum reliability). The SCCP message would leave STP 202 with a normal signaling message priority but with a higher IP TOS value. The second message received by STP 206 is similarly handled. This SCCP message, having a CgPA OPC of 5-2-1 and a CdPA SSN of 10, will have a priority field set to 1 and the IP TOS set to 0100 (maximum throughput). The second message signaling unit will leave STP 206 with a higher priority and higher IP type of service than the first message signaling unit. Thus, the second MSU will have a higher probability of being delivered than the first MSU. Although both MSU messages have the same MTP priority, the precedence and TOS bits of the IP packet are set based on the identity of the originating user. Thus, the network operator may establish different classes of service for user messages and set the priority of the user message based upon the class of service chosen by the user.

Figure 9A:
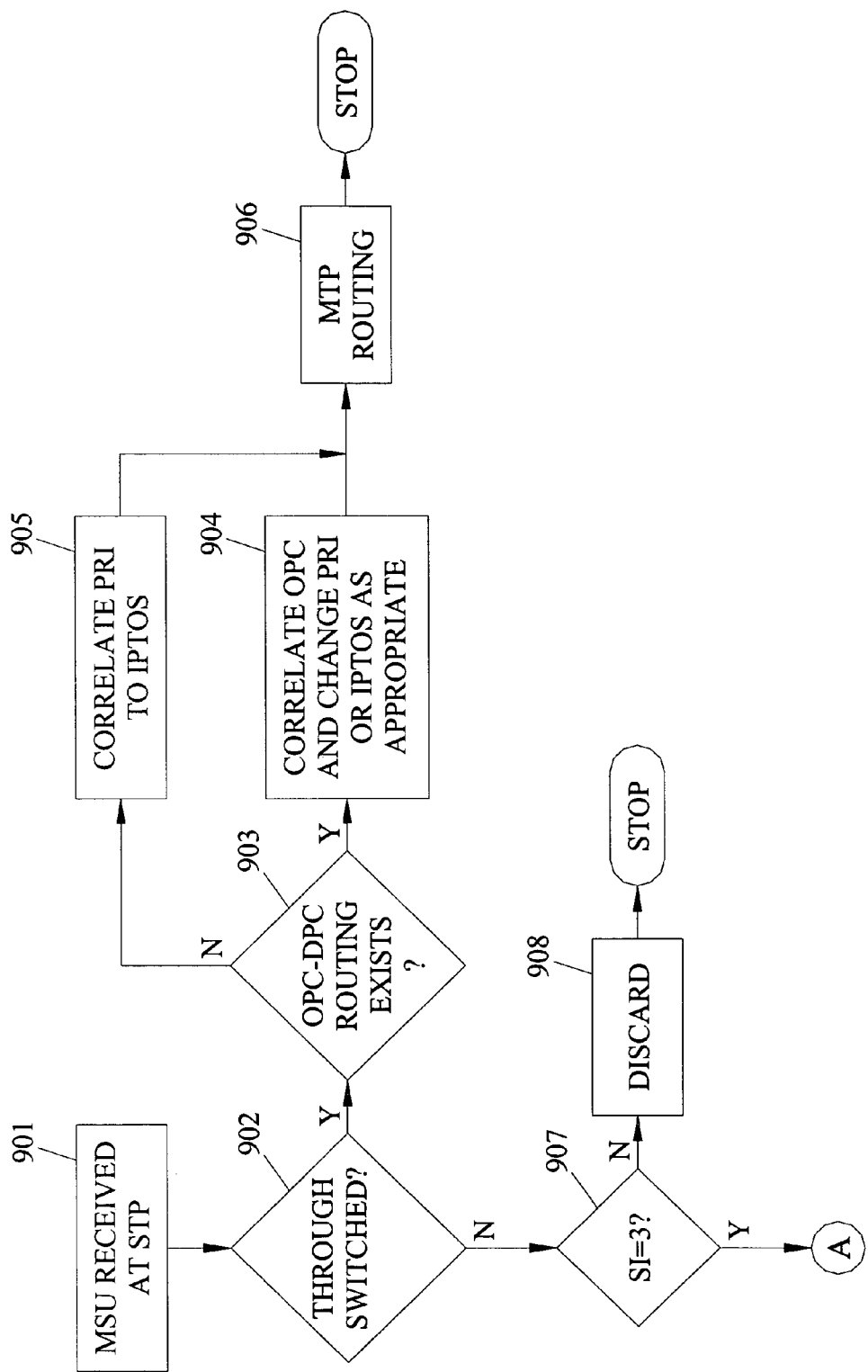
Figure 9C:
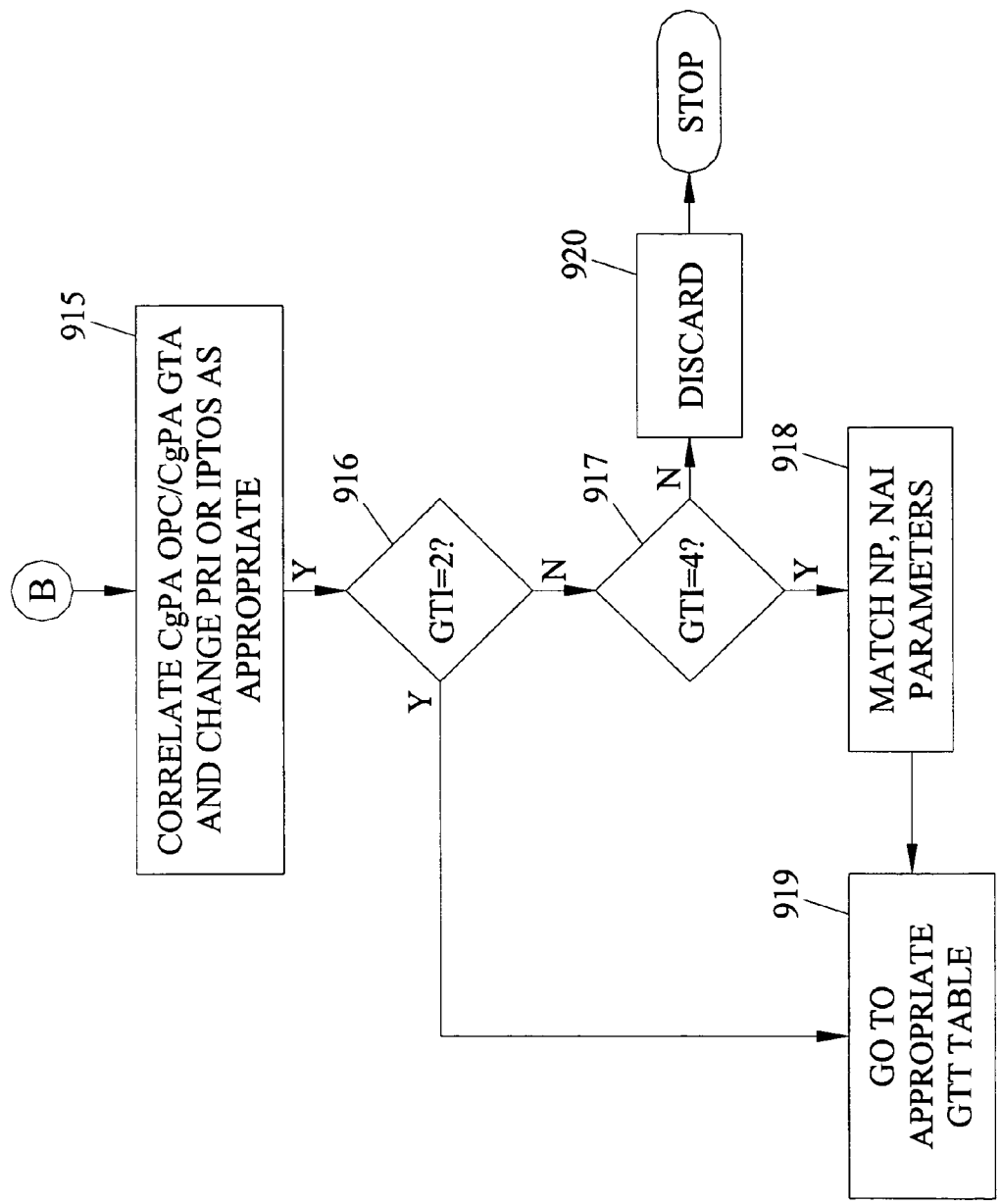

FIGS. 9A-9C are a flow diagram of an exemplary process for correlating signaling priority and IP type of service. Referring to FIG. 9A, in step 901, the message signaling unit is received at a STP. The STP, in step 902, determines whether the MSU should be through switched. If the MSU is to be through switched, the STP determines whether the MSU parameters match those in the OPC routing table (step 903). As illustrated in FIG. 8, the OPC routing table can be used to change the routing of a signaling message based on one or more originating party parameters in the signaling message. According to the present invention, originating and/or destination party information, referred to herein as user information, can also be used to change the SS7 and/or IP priority of a message. Accordingly, if the user parameters match one or more entries in the OPC routing table, in step 904, the STP correlates the OPC information and changes the priority and/ or IP TOS as appropriate. Otherwise, in step 905, the STP correlates the priority of the MSU to the IP TOS. For example, if the MSU is an ISUP, SCCP, OMAP, MTP, or B-ISUP message, the MTP priority values in the attached appendix may be read from the MSU and mapped to a corresponding priority value in the IP TOS octet. After completing either step 904 or step 905, the STP routes the encapsulated MSU through the IP network to the next signaling point (step 906).

If in step 902, the STP determines that the MSU is not to be through switched, the STP determines if the MSU is carrying an SCCP message, for example by examining the service indicator, in step 907. If the message is not an SCCP message, in step 908 the STP discharges the message.

If, however, the MSU is carrying an SCCP message, control proceeds to step 909 in FIG. 9B, where the STP determines if the calling party originating point code is present (step 909). If not, in step 910 the STP determines if the calling party address is present. If so, in step 911, the STP matches the calling party address against the GTT table. If either the calling party address is not present or the calling party address does not match an address in the GTT table, processing continues with step 914, which is discussed below.

In step 909, if the calling party OPC was present, the STP tries to match the calling party OPC against the values in the GTT table (step 912). If no match is found, the STP correlates the priority of the MSU to the IP TOS and routes the message (step 913). If the calling party OPC matches a value in the GTT or if the calling party address is not present or does not match a value in the GTT table, processing continues with step 914, in which the STP matches the called party SSN if the SSN is present. After matching the called party SSN with an SSN in the GTT table, control proceeds to step 915 in FIG. 9C, where the STP correlates the calling party OPC and/or the calling party GTA and changes the priority or IP TOS as appropriate.

Once the priority and type of service has been determined in step 915, the global title indicator (GTI) of the message is examined to determine the format of the global title field. In steps 916 and 917, it is determined whether the global title indicator is 2 or 4, which indicates ANSI or ITU formatting, respectively. If the GTI equals 2, the appropriate GTT table is consulted to obtain the global title information. If the GTI equals 4, the NP and NAI parameters of the message are used to determine which GTT table to consult in step 918. In step 919, the selected GTT table is accessed and used to translate the called party address in the message into a point code. After the destination point code is translated, the message is routed over the signaling link associated with the translated destination point code. If the outbound signaling link is an IP link, the IP TOS octet may be set according to the value selected using the steps in FIGS. 9A-9C. If the outbound signaling link is an SS7 signaling link, the MTP priority may be set according to the steps in FIGS. 9A-9C. If the global title indicator is not equal to 2 or 4, the message is discarded in step 920.

Accordingly, the present invention provides a system and method to assign a priority to an IP packet based on the priority of the signaling message that is encapsulated in the packet.

The present invention also provides a system and method to indicate a desired level of service for a user message and reflect the level of service in the packet in which the user message is encapsulated.

Although the examples described above relate primarily to IPv4, the present invention is not limited to mapping SS7 priorities to IPv4 priorities. For example, the methods and systems described herein can be used to map SS7 priorities to IPv6 priorities. IPv6 priorities may be set by writing appropriate values to the traffic class octet in the IPv6 header based on an SS7 priority level and/or a user-based priority. IPv6 priorities are described in detail in IETF RFC 2474, the disclosure of which is incorporated herein by reference in its entirety.

It will be understood that various details of the invention may be changed without departing from the scope of the invention. Furthermore, the foregoing description is for the purpose of illustration only, and not for the purpose of limitation, as the invention is defined by the claims as set forth hereinafter.

APPENDIX

TABLE A1

T1.111.5 Priority Assignments for ISUP Messages

| | Message Type | Priority |
|---|---|---|
| ACM | Address Complete | 1 |
| ANM | Answer | 2 |
| APM | Application Transport | 0-1a |
| BLA | Blocking Acknowledgement | 0 |
| BLO | Blocking | 0 |
| CCR | Continuity Check Request | 1 |
| CFN | Confusion | 0 |
| CGB | Circuit Group Blocking | 0 |
| CGBA | Circuit Group Blocking Acknowledgement | 0 |
| CGU | Circuit Group Unblocking | 0 |
| CGUA | Circuit Group Unblocking Acknowledgement | 0 |
| COT | Continuity | 1 |
| CPG | Call Progress | 1 |
| CQM | Circuit Query | 0 |
| CQR | Circuit Query Response | 0 |
| CRA | Circuit Reservation Acknowledgement | 0 |
| CRM | Circuit Reservation | 0 |
| CVR | Circuit Validation Response | 0 |
| CVT | Circuit Validation Test | 0 |
| EXM | Exit (Intra Network Applications Only) | 1 |
| FAC | Facility | 1-2b |
| FOT | Forward Test | 1 |
| GRA | Circuit Group Reset Acknowledgement | 0 |
| GRS | Circuit Group Reset | 0 |
| IAM | Initial Address | 0 |
| INF | Information | 1 |
| INR | Information Request | 1 |
| LPA | Loop Back Acknowledgement | 1 |
| PAM | Pass Along | 0-2c |
| PRI | Pre-Release Information | 0 |
| REL | Release | 1 |
| RES | Resume | 1 |
| RLC | Release Complete | 2 |
| RSC | Reset Circuit | 0 |
| SGM | Segmentation | 0d |
| SUS | Suspend | 1 |
| UBA | Unblocking Acknowledgement | 0 |
| UBL | Unblocking | 0 |
| UCIC | Unequipped Circuit Identification Code | 1 | aThe default value is "0." Criteria for assigning a value other than "0" is for further study.
bFurther study is needed on the exact assignment of a priority to the facility message. An assignment of 0 or 1 is given for guidance until complete service and network capability uses and needs of the facility message are determined.

TABLE A2

T1.111.5 Priority Assignments for SCCP Messages

| | Message Type | Priority |
|---|---|---|
| AK | Acknowledgement | 0-1a |
| CC | Connection Confirm | 1 |
| CR | Connection Request | 0-1a |

TABLE A2-continued

T1.111.5 Priority Assignments for SCCP Messages

| | Message Type | Priority |
|---|---|---|
| CREF | Connection Refused | 1 |
| DT1 | Data Form 1 | 0-1a |
| DT2 | Data Form 2 | 0-1a |
| EA | Expedited Data Acknowledgement | 1 |
| ED | Expedited Data | 1 |
| ERR | Error | 1 |
| IT | Inactivity Test | 1 |
| LUDT | Long Unit Data | 0-2b |
| LUDTS | Long Unit Data Service | 0-2b |
| RLC | Release Complete | 2 |
| RLSD | Released | 2 |
| RSC | Reset Confirmation | 1 |
| RSR | Reset Request | 1 |
| SBR | Subsystem-Backup-Routing | 0 |
| SNR | Subsystem-Normal-Routing | 0 |
| SOG | Subsystem-Out-Of-Service-Grant | 1 |
| SOR | Subsystem-Out-Of-Service-Request | 1 |
| SRT | Subsystem-Routing-Status-Test | 0 |
| SSA | Subsystem-Allowed | 3 |
| SSP | Subsystem-Prohibited | 3 |
| SST | Subsystem-Status-Test | 2 |
| UDT | Unit Data | 0-2b |
| UDTS | Unit Data Service | 0-2b |
| XUDT | Extended Unit Data | 0-2b |
| XUDTS | Extended Unit Data Service | 0-2b | aThe priority of corresponding messages should match that of the connection request. Selection of the priority within the given range for the connection request is application-dependent.
bPriority 2 is reserved for OMAP use. Selection of priorities 0 and 1 is application-dependent. Priority 2 is also reserved for application used in support of calls limited to those network services or capabilities that have been approved in ANSI T1 standards to have an IAM message priority of 1 (e.g., High Probability of Completion, and Multi-level Precedence and Preemption).

TABLE A3

T1.111.5 Priority Assignments for OMAP Messages

| | Message Type | Priority |
|---|---|---|
| BULK | OMAP Bulk Data Transfer (for further study) | 0 |
| FTA | Facility Test Acknowledgement | 2 |
| FTL | Facility Test Loopback | 2 |
| FTR | Facility Test Results | 2 |
| FTU | Facility Test Underway | 2 |
| LEA | Link Equipment Available | 2 |
| LEU | Link Equipment Unavailable | 2 |
| MRVA | MTP Routing Verification Acknowledgement | 2a |
| MRVR | MTP Routing Verification Result | 2 |
| MRVT | MTP Routing Verification Test | 2 |
| SRVA | SCCP Routing Verification Acknowledgement | 2 |
| SRVR | SCCP Routing Verification Result | 2 |
| SRVT | SCCP Routing Verification Test | 2 | aPriority level 3 may be used optionally for intranetwork MRV and SRV messages when severe network conditions, such as congestion due to a routing problem, do not allow the test to run at priority level 2.
NOTE: It is recommended that client company networks only use priority level 2 for MRV and SRV messages.

TABLE A4

T1.111.5 Priority Assignments for MTP Messages

| | Message Type | Priority |
|---|---|---|
| CBA | Changeback-Acknowledgement Signal | 3 |
| CBD | Changeback-Declaration Signal | 3 |
| CNP | Changeback-Not-Possible Signal | 3 |
| CNS | Connection-Not-Successful | 3 |
| COA | Changeover-Acknowledgement Signal | 3 |

TABLE A4-continued

T1.111.5 Priority Assignments for MTP Messages

| | Message Type | Priority |
|---|---|---|
| COO | Changeover-Order-Signal | 3 |
| CSS | Connection-Successful-Signal | 3 |
| DLC | Data-Link-Connection-Order | 3 |
| ECA | Emergency-Changeover-Acknowledgement Signal | 3 |
| ECO | Emergency-Changeover-Order Signal | 3 |
| LFU | Link Force Inhibit Message | 3 |
| LIA | Link Inhibit Acknowledgement Message | 3 |
| LID | Link Inhibit Denied Message | 3 |
| LIN | Link Inhibit Message | 3 |
| LLI | Link Local Inhibit Signal | 3 |
| LRI | Link Remote Inhibit Test Signal | 3 |
| LUA | Link Uninhibit Acknowledgement | 3 |
| LUN | Link Uninhibit Message | 3 |
| RCP | Route-Set-Test Cluster Prohibited Signal | 3 |
| RCR | Route-Set-Test Cluster Restricted Signal | 3 |
| RCT | Route-Set-Congestion-Test Signal | 0-2a |
| RSP | Route-Set-Test Prohibited Signal | 3 |
| RSR | Route-Set-Test Restricted Signal | 3 |
| SLT | Signalling-Link Test Message | 3 |
| SLA | Signalling-Link Test Acknowledgement | 3 |
| TCA | Transfer-Cluster-Allowed Signal | 3 |
| TCP | Transfer-Cluster-Prohibited Signal | 3 |
| TCR | Transfer-Cluster-Restricted Signal | 3 |
| TFA | Transfer-Allowed Signal | 3 |
| TFC | Transfer-Controlled Signal | 3 |
| TFP | Transfer-Prohibited Signal | 3 |
| TFR | Transfer-Restricted Signal | 3 |
| TRA | Traffic Restart Allowed Signal | 3 |
| TRW | Traffic Restart Waiting Signal | 3 |
| UPU | User Part Unavailable Message | 3 | aPriority assignment is always one less than current congestion level.

TABLE A5

T1.111.5 Priority Assignments for B-ISUP Messages

| | Message Type | Priority |
|---|---|---|
| ACM | Address Complete | 1 |
| ANM | Answer | 2 |
| BLA | Blocking Acknowledgement | 0 |
| BLO | Blocking | 0 |
| CCE | Consistency Check End | 0 |
| CCEA | Consistency Check End Acknowledgement | 0 |
| CFN | Confusion | 0 |
| CPG | Call Progress | 1 |
| CSR | Consistency Check Request | 0 |
| CSRA | Consistency Check Request Acknowledgement | 0 |
| EXM | Exit (Intra Network Application Only) | 1 |
| FOT | Forward Transfer | 1 |
| IAA | Initial Address Acknowledgement | 2 |
| IAM | Initial Address | 0 |
| IAR | Initial Address Reject | 1 |
| RAM | Reset Acknowledgement | 2 |
| REL | Release | 1 |
| RES | Resume | 1 |
| RLC | Release Complete | 2 |
| RSM | Reset | 1 |
| SGM | Segmentation (national use) | 0-2 |
| SUS | Suspend | 1 |
| UBA | Unblocking Acknowledgement | 0 |
| UBL | Unblocking | 0 |
| UPA | User Part Available | 0 |
| UPT | User Part Test | 0 |

What is claimed is:
1. A method of auto-correlating signaling message priority and an Internet protocol (IP) priority in a converged network environment, comprising:
 (a) determining a priority level of a signaling message by ascertaining a value of a priority parameter in the sig- naling message used to indicate a priority of the signaling message in a protocol distinct from Internet Protocol;
(b) encapsulating the signaling message in an IP packet;
(c) setting a priority level of the IP packet based on the priority level determined for the signaling message; and
(d) transmitting the IP packet to an IP network, wherein the signaling message comprises an SS7 message signaling unit (MSU) and wherein determining the priority level of the signaling message by ascertaining a value of a priority parameter includes determining the priority level based on a message transfer part (MTP) priority parameter.

2. The method of claim 1 wherein determining the priority level of the signaling message by ascertaining a value of a priority parameter in the signaling message includes determining the priority level based on at least one of a calling party address and an originating point code in the SS7 MSU.

3. The method of claim 1 wherein determining the priority level of the signaling message by ascertaining a value of a priority parameter in the signaling message and includes determining the priority level based on at least one of a calling party address, originating point code, and subsystem number in the SS7 MSU.

4. The method of claim 1 wherein the message comprises an SS7 network management message and wherein determining the priority level of the signaling message by ascertaining a value of a priority parameter in the signaling message includes determining the priority level based on a message transfer part (MTP) priority parameter in the network management message.

5. The method of claim 1 wherein the message comprises an SS7 call setup message and wherein determining the priority level of the signaling message includes determining the priority level based on the MTP priority parameter in the call setup message.

6. The method of claim 1 wherein the message comprises an SS7 database query message and wherein determining the priority level of the signaling message includes determining the priority level based on the MTP priority parameter in the database query message.

7. The method of claim 1 wherein the signaling message comprises a non-SS7 call setup message and wherein determining a priority level of the signaling message includes determining a priority level of the signaling message based on at least one of a priority parameter and a user parameter in the non-SS7 call setup message.

8. The method of claim 1 wherein the signaling message comprises a non-SS7 network management message and wherein determining a priority level of the signaling message includes determining a priority level of the signaling message based on at least one of a priority parameter and a user parameter in the non-SS7 network management message.

9. The method of claim 1 wherein the signaling message comprises a SIP message and wherein determining a priority level of the signaling message includes determining a priority level of the signaling message based on at least one of a priority parameter and a user parameter in the SIP message.

10. The method of claim 1 wherein setting the priority level of the IP packet includes setting bits in a type of service (TOS) octet of a header portion of the IP packet.

11. The method of claim 10 wherein setting bits in the TOS octet includes setting precedence bits.

12. The method of claim 10 wherein setting bits in the TOS octet includes setting type of service bits.

13. The method of claim 10 wherein setting bits in the TOS octet includes setting precedence bits and type of service bits.

14. The method of claim 1 comprising changing the priority level of the signaling message based on at least one parameter in the signaling message.

15. The method of claim 1 wherein setting the priority level of the IP packet includes consulting a lookup table.

16. A method for mapping priority for an SS7 network management message to a priority parameter in an IP message, the method comprising:
(a) receiving an SS7 network management message;
(b) reading a priority parameter from the SS7 network management message, wherein the priority parameter is used to indicate a priority of the SS7 network management message in a protocol distinct from Internet Protocol;
(c) mapping the priority parameter in the SS7 network management message to an IP priority parameter;
(d) encapsulating the SS7 network management message in an IP packet including the IP priority parameter; and
(e) transmitting the IP encapsulated SS7 network management message, wherein the network management message comprises an SS7 message signaling unit (MSU) and wherein mapping the priority parameter includes examining an SS7 message transfer part (MTP) priority parameter to determine the priority of the SS7 MSU.

17. A signaling gateway comprising:
(a) a first interface module operatively coupled to a first network, the first interface module being capable of receiving a signaling message from the first network;
(b) a priority determination process for determining the priority of the received signaling message by ascertaining a value of a priority parameter in the signaling message used to indicate a priority of the signaling message in a protocol distinct from Internet Protocol; and
(c) a second interface module operatively coupled to the priority determination process and to a second network, the second interface module being capable of encapsulating the received signaling message in a packet and transmitting the packet on the second network, wherein the priority determination process is adapted to set priority information in the packet based on the priority determined for the received signaling message, wherein the signaling message comprises an SS7 message signaling unit (MSU) and the priority determination process is adapted to examine an SS7 message transfer part (MTP) priority parameter to determine the priority of the SS7 MSU.

18. The signaling gateway of claim 17 wherein the signaling message comprises an SS7 message signaling unit (MSU) and the priority determination process is adapted to examine calling party information in the SS7 MSU to determine the priority of the SS7 MSU.

19. The signaling gateway of claim 17 wherein the signaling message comprises an SS7 network management message and the priority determination process is adapted to examine the MTP priority parameter to determine the priority of the SS7 network management message.

20. The signaling gateway of claim 17 wherein the signaling message comprises a non-SS7 call setup message and wherein the priority determination process is adapted to examine a calling party parameter in the non-SS7 signaling message to determine the priority of the non-SS7 signaling message.

21. The signaling gateway of claim 17 wherein the priority determination process is adapted to change the priority parameter in the signaling message.

22. The signaling gateway of claim 17 wherein the priority determination process is adapted to examine a lookup table to determine the priority of the message.

23. The signaling gateway of claim 22 wherein the lookup table includes user-defined priority information.

24. The signaling gateway of claim 23 wherein the lookup table includes user defined priority information based on at least one of a calling party address and originating point code in the received signaling message.

25. The signaling gateway of claim 23 wherein the lookup table includes user defined priority information based upon a calling party subsystem number in the received signaling message.

26. The signaling gateway of claim 23 wherein the lookup table includes MTP priority values for changing the priority of the signaling message.

27. The signaling gateway of claim 17 wherein the priority determination process resides on the second interface module.

28. The signaling gateway of claim 17 comprising a database services module operatively associated with the first and second interface modules wherein the priority determination process is located on the database services module.

* * * * *